US011110559B2

(12) United States Patent
Cross

(10) Patent No.: US 11,110,559 B2
(45) Date of Patent: Sep. 7, 2021

(54) CLAMP SUPPORT SYSTEM

(71) Applicant: Woodpeckers, LLC, Strongsville, OH (US)

(72) Inventor: Steven Charles Cross, Mentor, OH (US)

(73) Assignee: WOODPECKERS, LLC, Strongsville, OH (US)

( * ) Notice: Subject to any disclaimer, the term of this patent is extended or adjusted under 35 U.S.C. 154(b) by 267 days.

(21) Appl. No.: 16/444,515

(22) Filed: Jun. 18, 2019

(65) Prior Publication Data

US 2019/0389017 A1    Dec. 26, 2019

Related U.S. Application Data

(63) Continuation-in-part of application No. 29/694,907, filed on Jun. 14, 2019, now Pat. No. Des. 865,475, which is a continuation-in-part of application No. 29/653,975, filed on Jun. 20, 2018, now Pat. No. Des. 865,473, which is a continuation-in-part of application No. 29/653,982, filed on Jun. 20, 2018, now Pat. No. Des. 865,474.

(60) Provisional application No. 62/687,424, filed on Jun. 20, 2018.

(51) Int. Cl.
*B23Q 3/00* (2006.01)
*B23Q 3/06* (2006.01)
*B23K 37/04* (2006.01)

(52) U.S. Cl.
CPC .......... *B23Q 3/007* (2013.01); *B23K 37/0435* (2013.01); *B23Q 3/06* (2013.01); *B23Q 2703/02* (2013.01)

(58) Field of Classification Search
CPC ......... B25B 1/2484; B25B 5/10; B25B 5/109; B25B 5/101; B25B 5/102; B25B 5/16; B25B 5/166; B25B 5/142
See application file for complete search history.

(56) References Cited

U.S. PATENT DOCUMENTS

| | | | |
|---|---|---|---|
| 117,383 A * | 7/1871 | Church | B27M 3/34 269/44 |
| 2,679,872 A * | 6/1954 | Sutcliffe | E04G 17/042 269/98 |
| 4,132,397 A * | 1/1979 | Ward | B25B 1/2484 248/201 |
| 4,300,754 A * | 11/1981 | Lawrence | B23K 37/0435 269/208 |
| 5,832,977 A | 11/1998 | Hampton | |

(Continued)

*Primary Examiner* — Tyrone V Hall, Jr.
(74) *Attorney, Agent, or Firm* — Sand, Sebolt & Wernow Co., LPA

(57) ABSTRACT

A clamp support system including a support rack having a pair of first sides and a pair of second sides that interlockingly engage each other. Slots are defined in each of the first sides and slots in the opposed and parallel first sides are aligned. One or more clamps are supported by the support rack. A bar of each clamp is received in a pair of aligned slots in the first sides. Each clamp includes a first jaw and a second jaw operatively engaged with the bar. A workpiece is positioned so that the first jaw of each clamp contacts a first side of the workpiece and the second jaw of each clamp contacts a second side. The first and second jaws are moved relative to each other to clamp the workpiece therebetween.

23 Claims, 23 Drawing Sheets

(56) References Cited

U.S. PATENT DOCUMENTS

| | | |
|---|---|---|
| 6,019,359 A * | 2/2000 | Fly .................... B23K 37/0461 |
| | | 269/289 R |
| D559,287 S | 1/2008 | McDaniel et al. |
| D560,235 S | 1/2008 | McDaniel |
| D569,882 S | 5/2008 | McDaniel et al. |
| D571,836 S | 6/2008 | McDaniel |
| D730,142 S | 5/2015 | Shapiro |
| 9,062,467 B1 | 6/2015 | Hanson |
| 2006/0283524 A1 | 12/2006 | McDaniel et al. |

\* cited by examiner

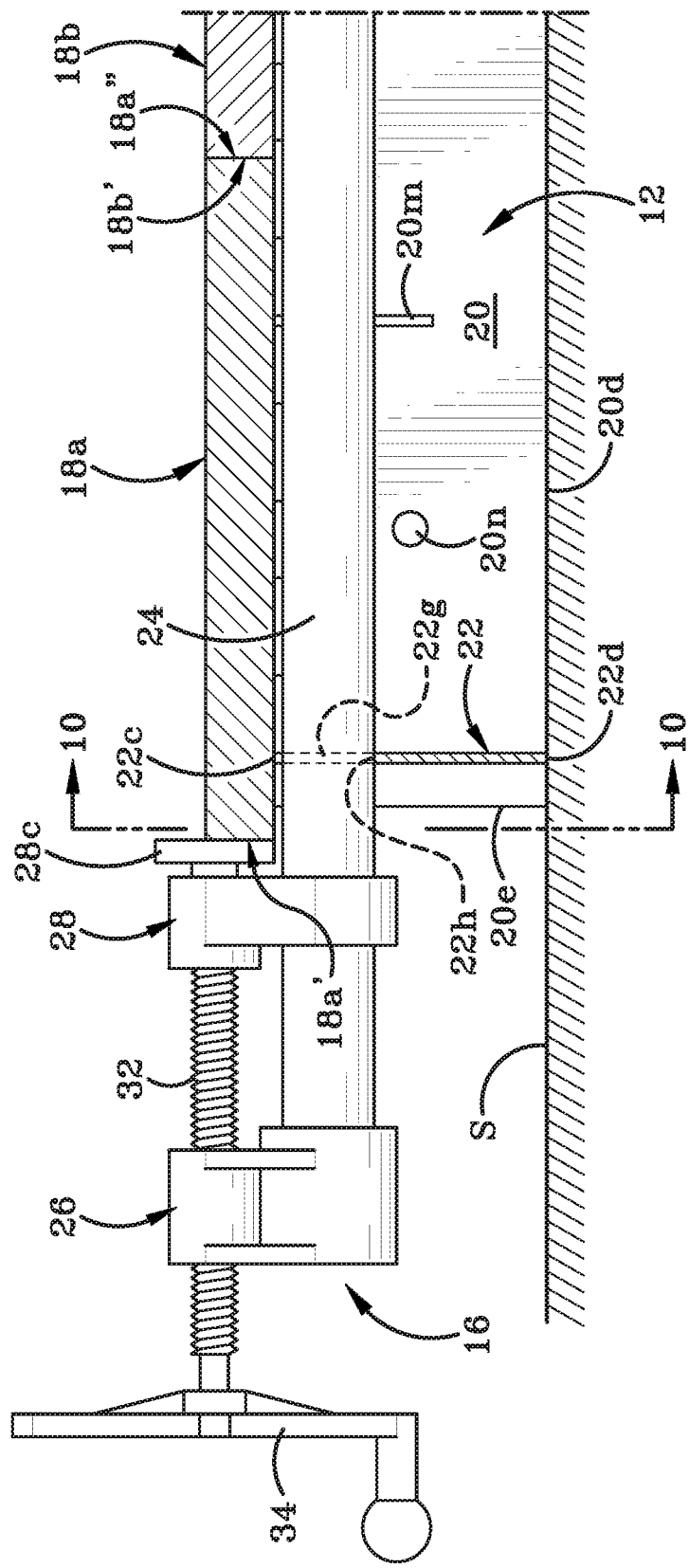

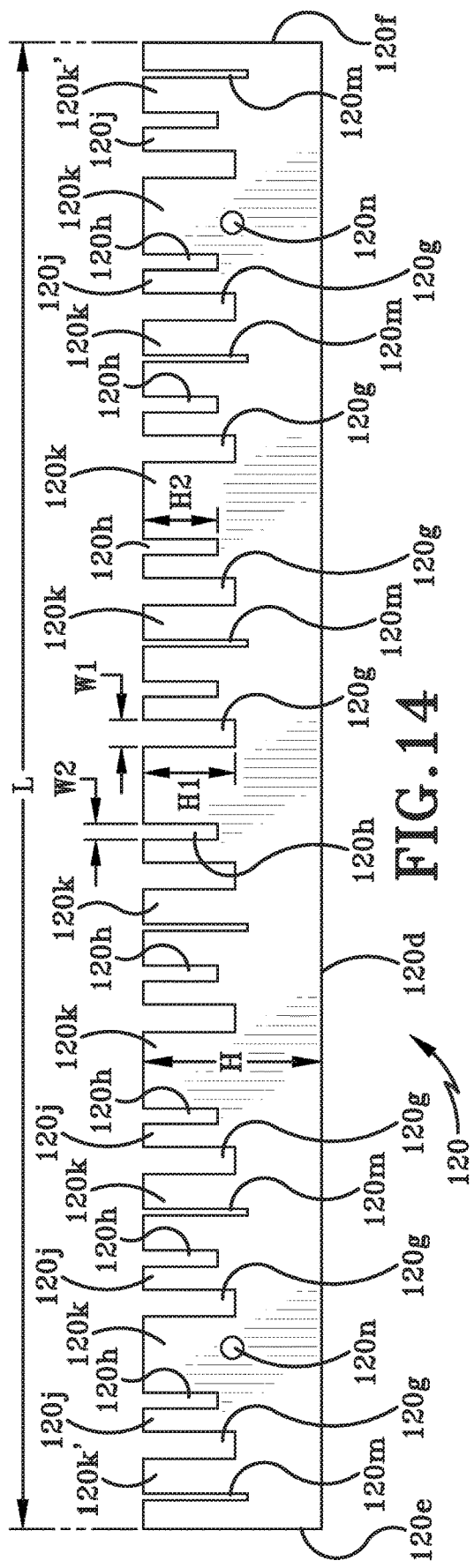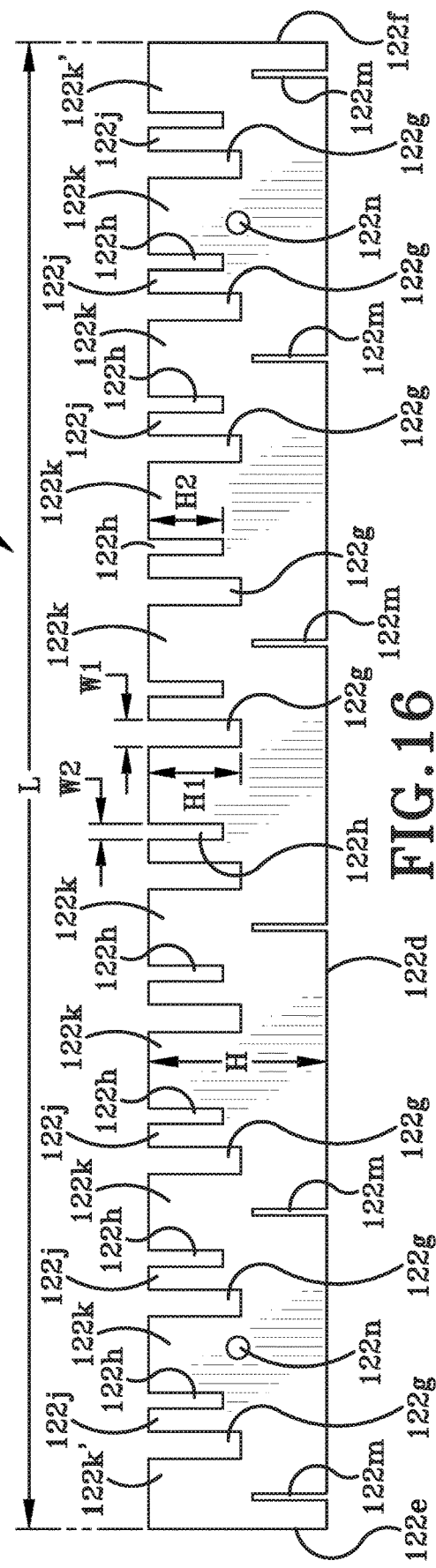

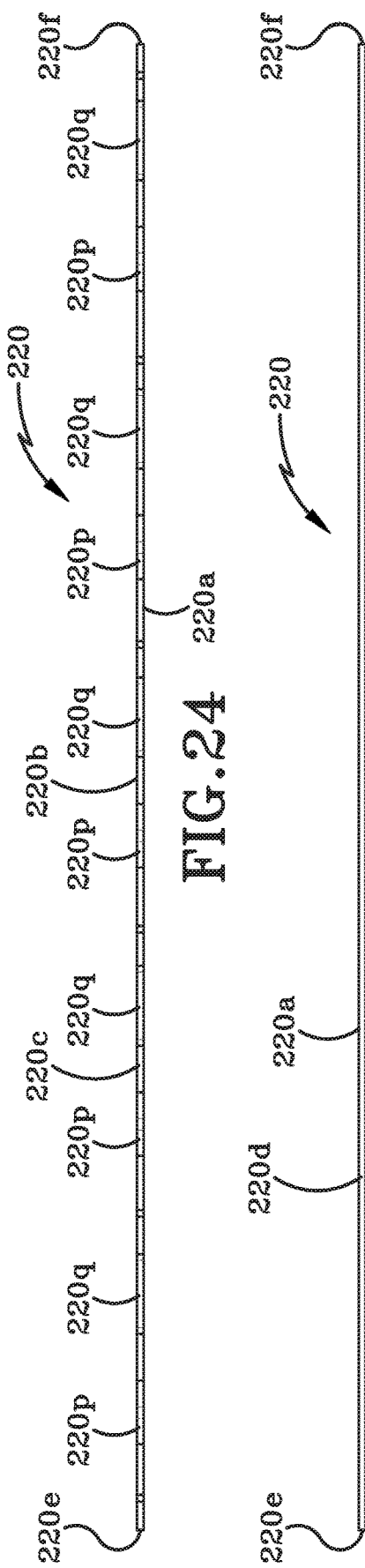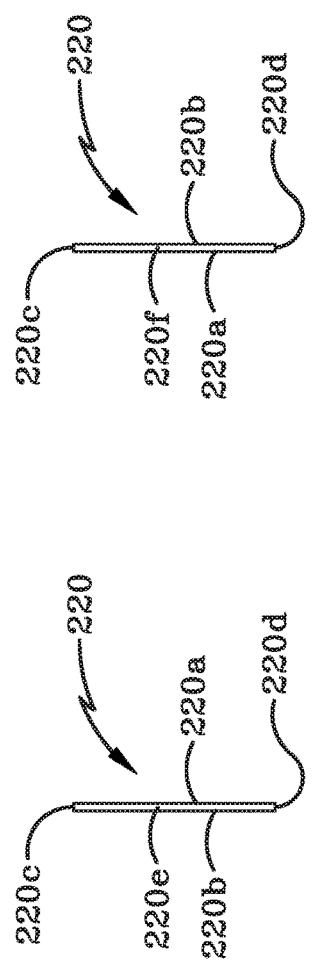
FIG. 24
FIG. 25
FIG. 26
FIG. 27

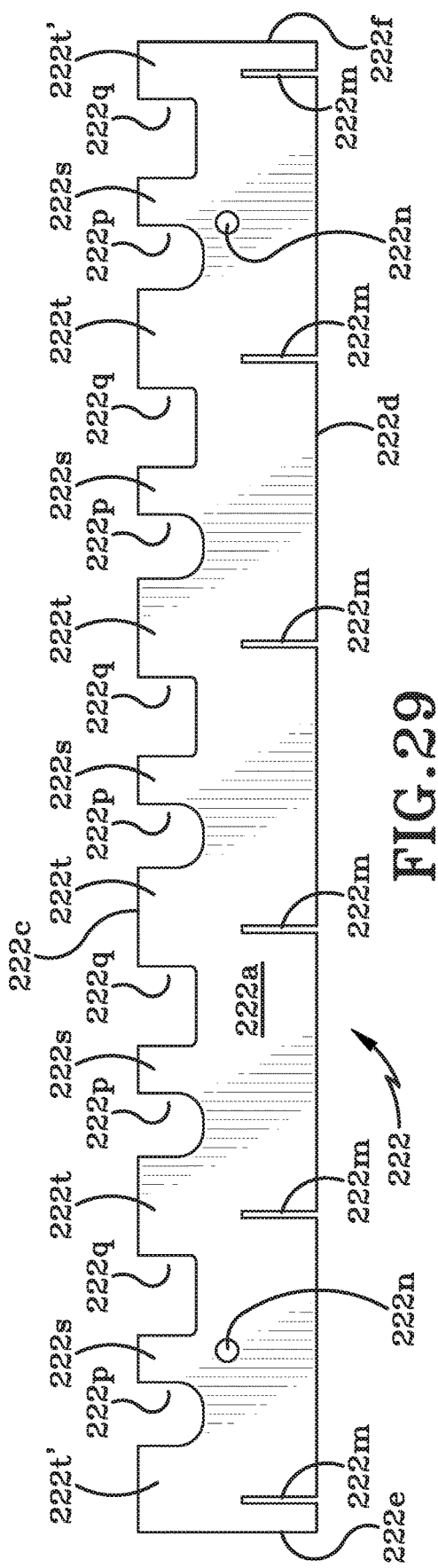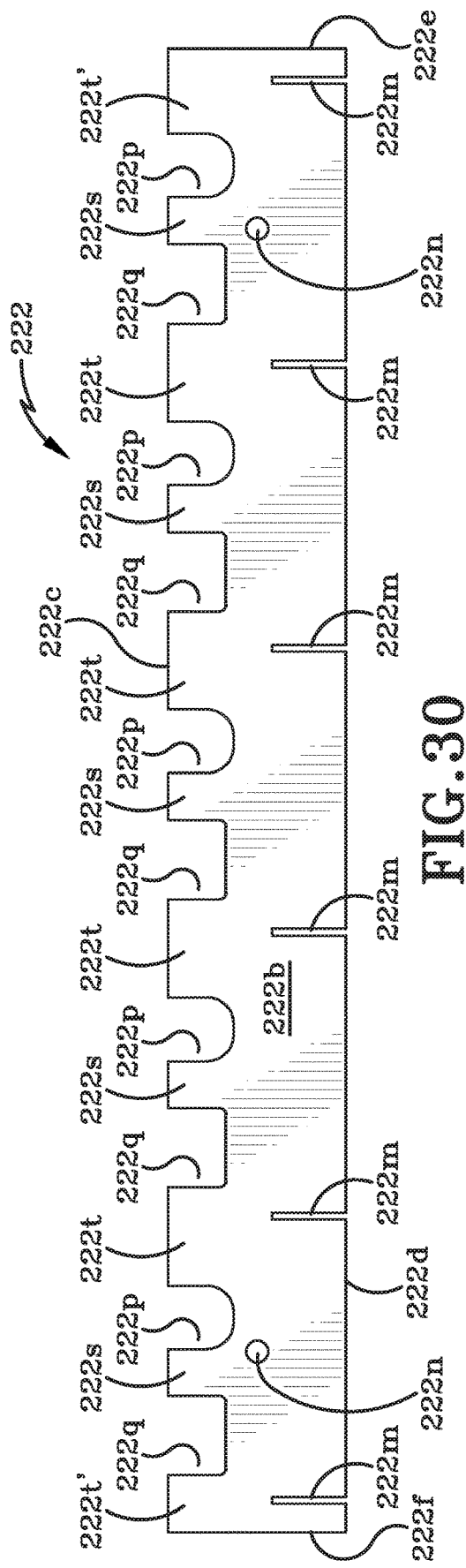

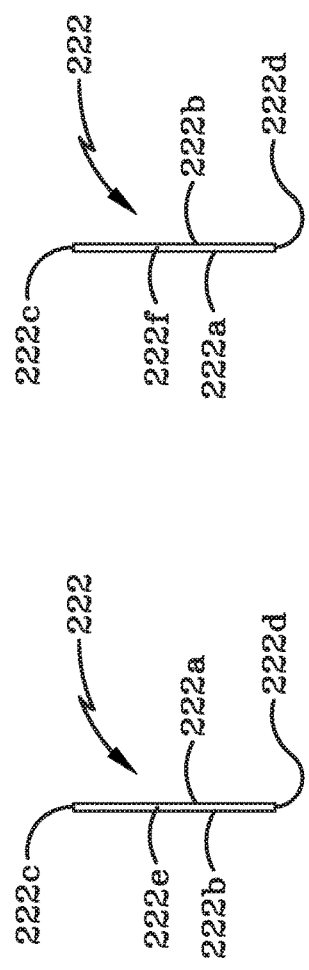
FIG. 31
FIG. 32
FIG. 33
FIG. 34

CLAMP SUPPORT SYSTEM

CROSS-REFERENCE TO RELATED APPLICATIONS

This application is a Continuation-in-Part of U.S. Design Pat. Application Serial No. 29/694,907, filed Jun. 14, 2019, which is a Continuation-in-Part of U.S. Design Pat. Application Serial No. 29/653,975 filed Jun. 20, 2018, and a Continuation-in-Part of U.S. Design Pat. Application Serial No. 29/653,982 filed Jun. 20, 2018.

This application claims the benefit of U.S. Provisional Patent Application Ser. No. 62/687,424 filed Jun. 20, 2018.

The entire disclosures of all of the above applications are incorporated herein by reference.

BACKGROUND

Technical Field

The present disclosure relates to tools, particularly woodworking tools. More specifically, the present disclosure is directed to clamping systems. In particular, the present disclosure relates to a clamp support system including a support rack that retains woodworking clamps in a particular orientation so that the clamps may be utilized to clamp a workpiece. The support rack comprises a plurality of interlocking support members that include specially-shaped slots that selectively receive the guide bar of a clamp therein.

Background Information

When carpenters or artisans secure two pieces of wood together, they typically apply an adhesive between opposed surfaces of the pieces of wood and then use clamps to hold the pieces in abutting contact until the adhesive dries. One of the issues with this procedure is that the clamps often have regions which extend above and/or below the pieces of wood that are being secured together. These regions may be shaped in such a way that prevents the clamps from being placed on a flat surface to allow the adhesive to dry. In many instances, as soon as a region of the clamp contacts the flat surface, the clamp shifts and causes the pieces of wood to move laterally or longitudinally relative to each other. The carpenter then has to reposition the clamps. If the carpenter does not notice the lateral or longitudinal shifting between the wood pieces before allowing the adhesive to dry, the end product will be found to be unsatisfactorily joined together.

SUMMARY

The clamp support system disclosed herein provides a suitable apparatus for clamping and holding one or more pieces of wood for a period of time and has a reduced tendency to allow slippage of the wood during clamping. The clamp support system further provides an improved apparatus for use when securing two pieces of wood together using an adhesive. The system clamps the two pieces of wood and holds them in such a way that the tendency for lateral and/or longitudinal shifting of the wood pieces relative to each other is reduced.

A clamp support system is disclosed that includes a support rack having a pair of first sides and a pair of second sides that interlockingly engage each other. Slots are defined in each of the first sides and slots in the opposed and parallel first sides are aligned. One or more clamps are supported by the support rack. A bar of each clamp is received in a pair of aligned slots in the first sides. Each clamp includes a first jaw and a second jaw operatively engaged with the bar. A workpiece is positioned so that the first jaw of each clamp contacts a first side of the workpiece and the second jaw of each clamp contacts a second side. The first and second jaws are moved relative to each other to clamp the workpiece therebetween.

In one aspect, the present disclosure may provide a support rack comprising a pair of first plates; a second plate; wherein each plate of the pair of first plates and the second plate includes a front surface, a back surface, a top edge, a bottom edge, a first end, and a second end; wherein each plate of the pair of first plates defines one or more slots originating in the top edge, extending downwardly toward the bottom edge, and terminating a distance upwardly from the bottom edge; wherein the one or more slots are adapted to receive a guide bar of a clamp therein; and wherein the second plate is detachably engageable with the pair of first plates.

In one aspect, the present disclosure may provide a clamp support system comprising a support rack having a pair of first plates; a pair of second plates; wherein the pair of second plates are detachably securable to the pair of first plates; one or more slots defined in each plate of the pair of first plates; wherein the one or more slots in a first one of the pair of first plates is aligned with the one or more slots in a second one of the pair of first plates; and a clamp including a bar configured to be removably received in the aligned one or more slots; and a first jaw and a second jaw operatively engaged with the bar; wherein the first jaw and the second jaw are adapted to clamp a workpiece therebetween.

In one aspect, the present disclosure may provide a method of clamping a workpiece comprising inserting a clamp bar of a clamp into a pair of aligned slots defined in a support rack; contacting a first side of the workpiece with a first jaw of the clamp; contacting a second side of the workpiece with a second jaw of the clamp; moving one of the first jaw and the second jaw toward the other of the first jaw and the second jaw; clamping the workpiece between the first and second jaws; and retaining the clamp and the workpiece a distance vertically off a flat surface using the support rack.

In another aspect the method of the present disclosure may include positioning a bottom edge of each of a pair of first plates of the support rack on the flat surface; orienting a second plate of the support rack above the pair of first plates and at right angles thereto; aligning a slit in a bottom edge of the second plate with a slit in a top edge of each of the pair of first plates; pushing the second plate downwardly toward the flat surface; interlocking the pair of first plates and the second plate together.

BRIEF DESCRIPTION OF THE SEVERAL VIEWS OF THE DRAWINGS

A sample embodiment of the disclosure is set forth in the following description, is shown in the drawings, and is particularly and distinctly pointed out and set forth in the appended claims. The accompanying drawings, which are fully incorporated herein and constitute a part of the specification, illustrate various examples, methods, and other example embodiments of various aspects of the disclosure. Elements may not be drawn to scale.

FIG. 9 is an enlarged front elevation view of a first end of the support system taken along line 9-9 of FIG. 1;

FIG. 14 is a front elevation view of the first support member of FIG. 12;

FIG. 16 is a front elevation view of the second support member of FIG. 15;

FIG. 24 is a top plan view of the first support member;

FIG. 25 is a bottom plan view of the first support member;

FIG. 26 is a first end view of the first support member;

FIG. 27 is a second end view of the first support member;

FIG. 29 is a front elevation view of the second support member;

FIG. 30 is a rear elevation view of the second support member;

FIG. 31 is a top plan view of the second support member;

FIG. 32 is a bottom plan view of the second support member;

FIG. 33 is a first end view of the second support member; and

FIG. 34 is a second end view of the first support member.

Similar numbers refer to similar parts throughout the drawings.

DETAILED DESCRIPTION

FIGS. 1-11 show a first embodiment of a clamp support system in accordance with the present disclosure, generally indicated at 10. FIGS. 12-18 show a second embodiment of a clamp support system in accordance with the present disclosure, generally indicated at 110. FIGS. 19-34 show a third embodiment of a clamp support system in accordance with the present disclosure, generally indicated at 210.

Figure 1:
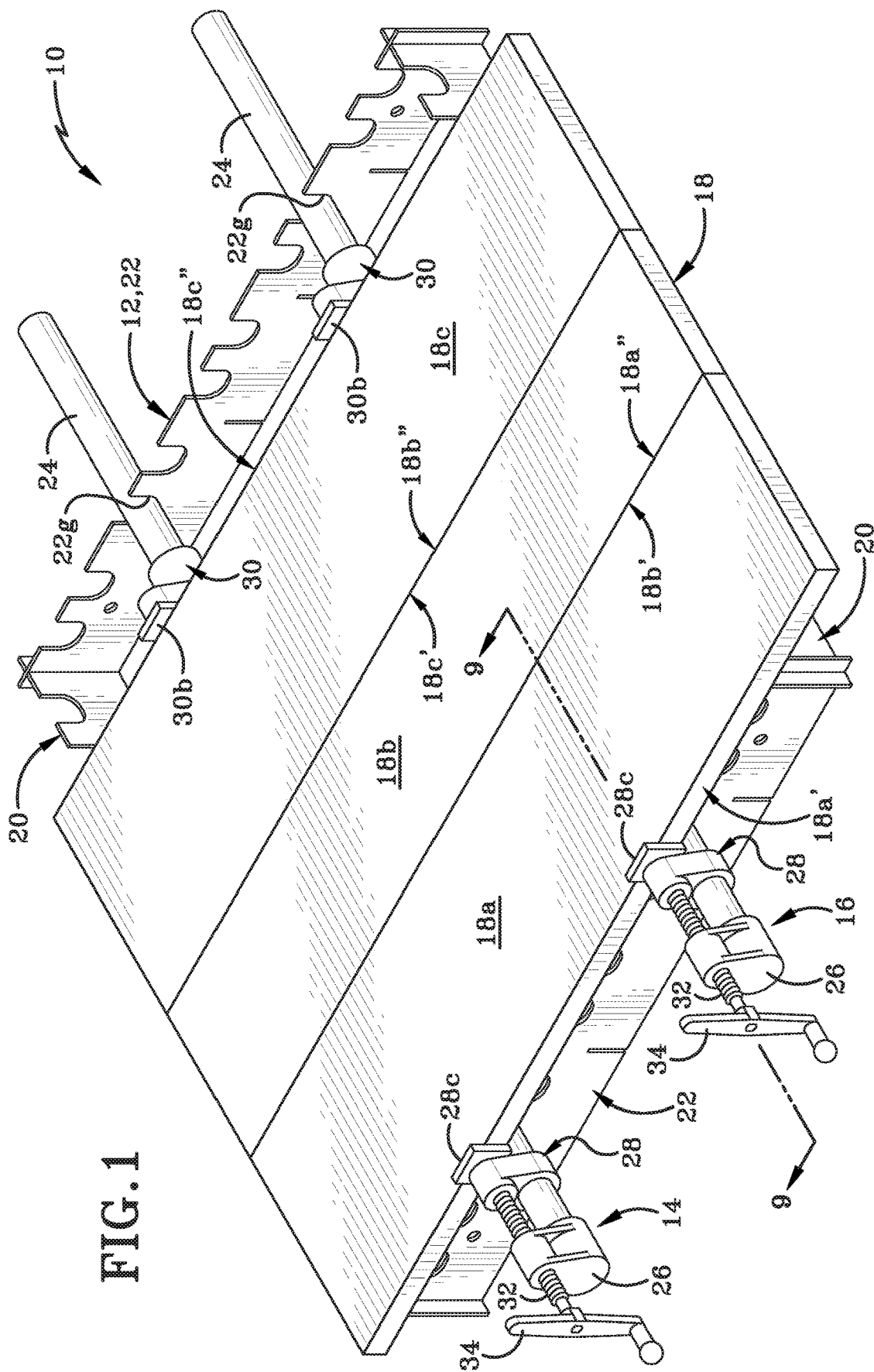
FIG. 1 is an isometric perspective top view of a first embodiment of a clamp support system in accordance with an aspect of the present disclosure shown with a pair of parallel clamps engaged with the clamp support and being used to clamp a plurality of wooden pieces together.

Referring now to FIGS. 1-11, there is shown a clamp support system 10 in accordance with an aspect of the present disclosure. Clamp support system 10 includes a support rack 12, a first clamp 14, and a second clamp 16. Clamp support system 10 is illustrated with the support rack 12 arranged to support first clamp 14 a distance apart from second clamp 16. First clamp 14 and second clamp 16 are oriented parallel to each other and are shown in FIG. 1 as extending laterally across support rack 12. In other examples, first clamp 14 and second clamp 16 may extend longitudinally across support rack 12.

In one example not shown herein, clamp support system 10 may comprise only the support rack 12 and one of the first clamp 14 and the second clamp 16. In one example not shown herein, the clamp support system 10 may comprise the support rack 12 and more than two clamp racks.

First and second clamps 14, 16, are shown in FIG. 1 being utilized to clamp a workpiece 18. Workpiece 18, as illustrated, comprises three boards 18a, 18b, 18c that are arranged in side-by-side abutting contact with each other. Boards 18a, 18b, 18c may be wooden boards or composite boards or any other similar components that require clamping in order to perform a task. First board 18a has a first side edge 18a' and a second side edge 18a"; second board 18b has a first side edge 18b' and a second side edge 18b"; and third board 18c has a first side edge 18c' and a second side edge 18c". As illustrated, the second side edge 18a" of first board 18a is in side-by-side abutting contact with the first side edge 18b' of second board 18b. Furthermore, the second side edge 18b" of second board 18b is in side-by-side abutting contact with the first side edge 18c' of third board 18c. An adhesive is applied to one or both of the sides 18a" and 18b', and to one or both of the side 18b" and 18c' prior to engaging clamps 14, 16. In one example, two of the boards, such as first board 18a and second board 18b, are secured together before third board 18c is secured to second board 18b. In other examples, all three boards will be secured together at the same time.

As illustrated in FIG. 1, the first and second clamps 14, 16 are utilized to keep the adjacent sides of the boards 18a, 18b, and 18c in contact with each other until the adhesive dries and secures the adjacent boards to each other. First and second clamps 14, 16 apply pressure to the boards 18a, 18b, and 18c. In particular, the first and second clamps 14, 16 apply pressure to the boards 18a, 18b, and 18c through direct contact with first side 18a' of first board 18a and second side 18c" of third board 18c. The pressure is a compressive force that is directed laterally inwardly toward a center region of the second board 18b, as this board is located between first board 18a and third board 18c.

Figure 2:
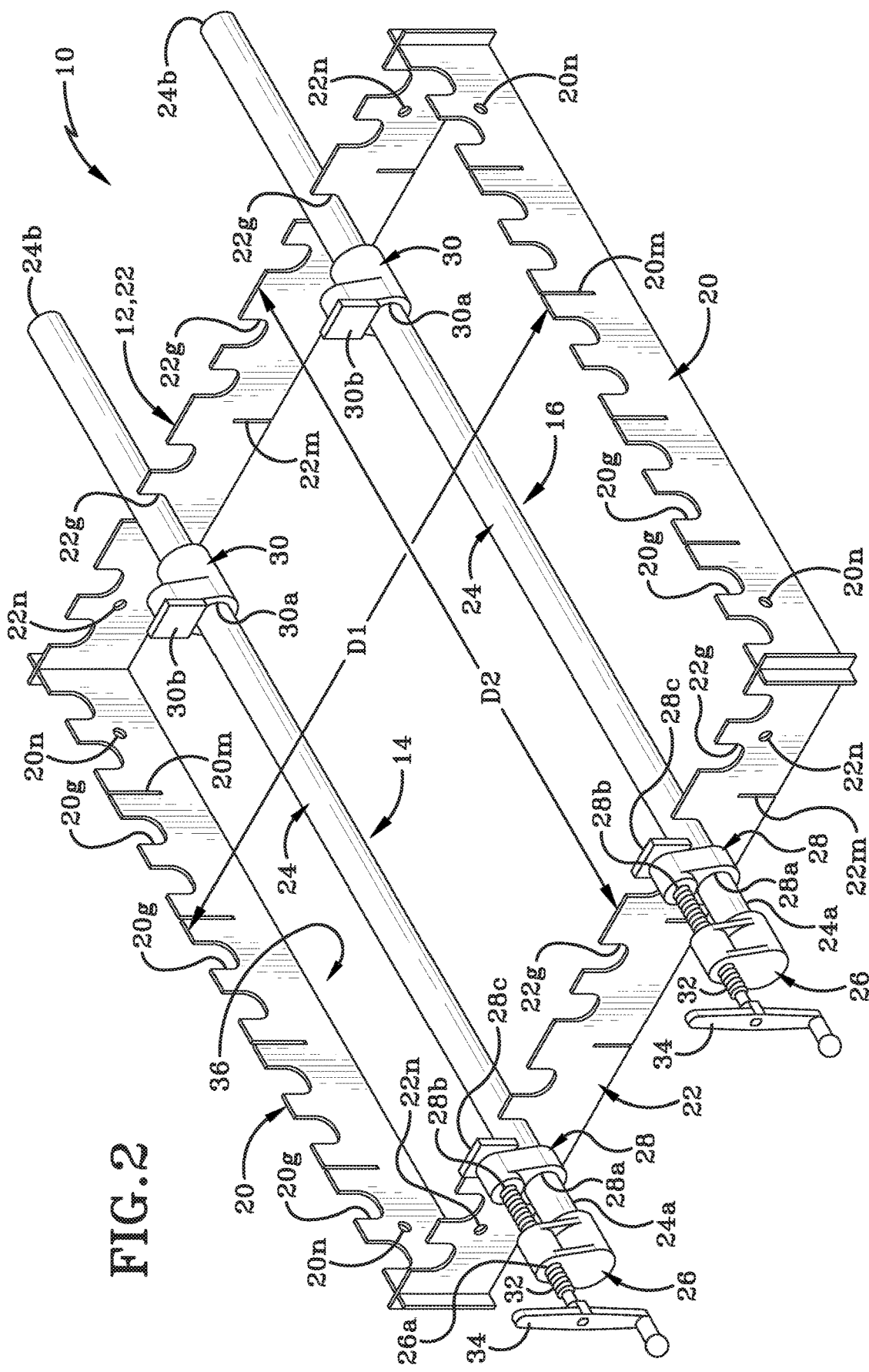
FIG. 2 is an isometric perspective top view of the clamp support system shown on its own.

FIG. 2 shows clamp support system 10 on its own, i.e., with boards 18a, 18b, and 18c removed. Support rack 12 is shown to comprise a pair of first plates 20 and a pair of second plates 22. First plates 20 are oriented parallel to each other and are spaced longitudinally a first distance "D1" apart from each other. First plates 20 form two opposing first sides of support rack 12. Second plates 22 are oriented parallel to each other and are spaced laterally a second distance "D2" apart from each other. Second plates 22 form two opposing second sides of support rack 12. (It will be understood in other examples that more than two parallel first plates 20 and/or more than two parallel second plates 22 may be utilized in support rack 12.)

Figure 3:
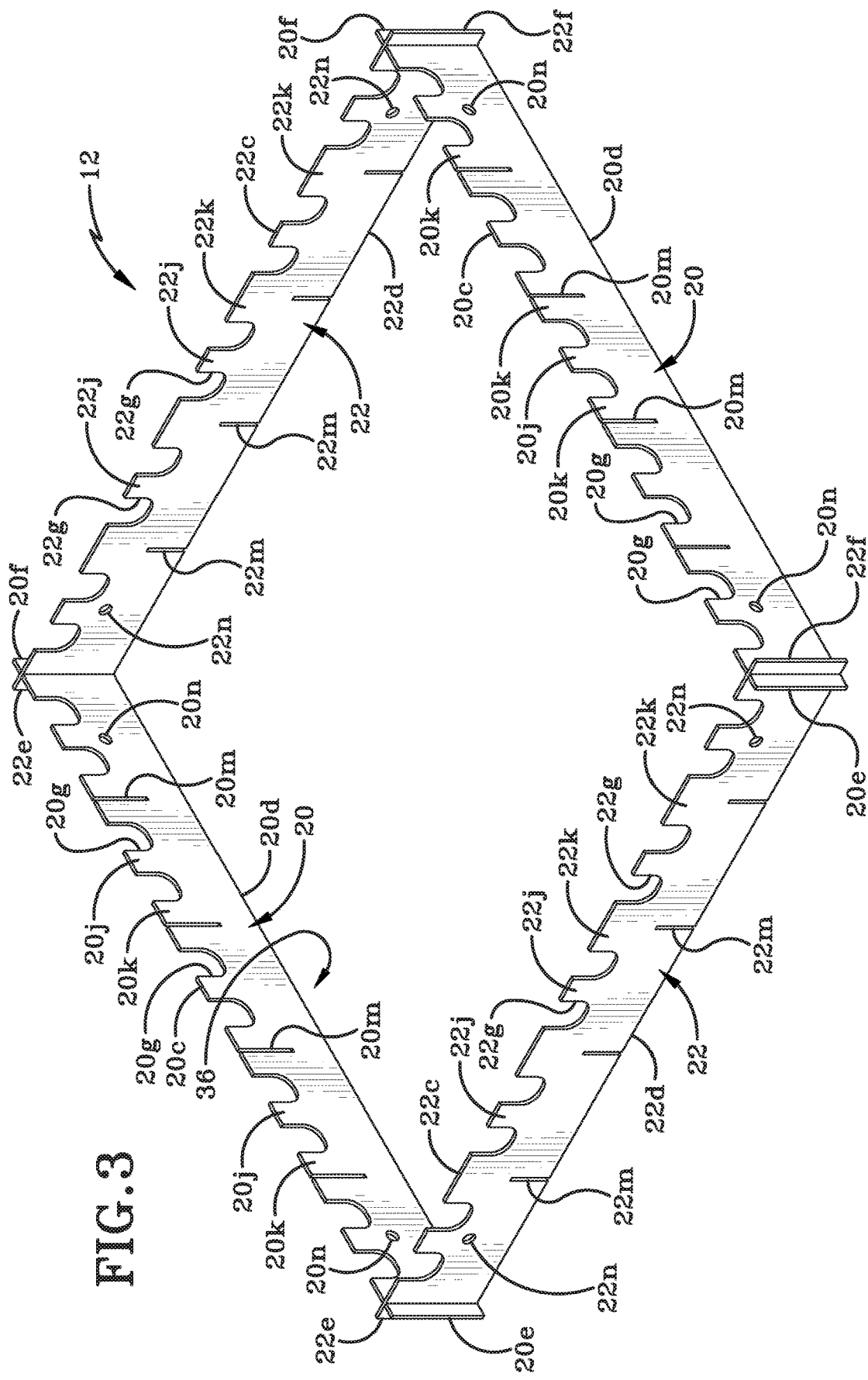
FIG. 3 is an isometric perspective top view of the support rack shown on its own.

First plates 20 are identical to each other. Second plates 22 are identical to each other. First plates 20 and second plates 22, while similar in many respects, are not identical to each other. First plates 20 and second plates 22 are, however, configured to interlockingly engage each other to form a frame that bounds and defines an empty space 36 (FIG. 3). The interlocking engagement between first plates 20 and second plates 22 is sufficient to hold the shape of frame without the need for any fasteners or other types of securement mechanism. First plates 20 and second plates 22 are designed so that the size of the support rack 12 may be longitudinally and/or laterally adjusted as desired. This will be illustrated and discussed later herein.

As indicated above, support rack 12 may be utilized to support one clamp such as first clamp 14, or two clamps, such as first clamp 14 and second clamp 16. One or more additional clamps (not shown) may also be supported on support rack 12. Each of first clamp 14 and second clamp 16 may be substantially identical or they may be different from each other but may operate on a similar principal. First clamp 14 includes a guide bar 24, a head 26, a first jaw 28, and a second jaw 30. Guide bar 24 has a first end 24a and a second end 24b. Each of the head 26, first jaw 28, and second jaw 30 defines an aperture therein and through which a portion of guide bar 24 is received. The first end 24a of guide bar 24 is received in the aperture (not shown) in head 26. The aperture 28a of first jaw 28 and the aperture 30a of second jaw 30 can be seen in FIG. 2 and the guide bar 24 extends through apertures 28a, 30a.

Each of the first jaw 28 and the second jaw 30 of first clamp 14 and of second clamp 16 are movable jaws. First jaw 28 is connected via a threaded rod 32 to head 26. A first end of threaded rod 32 is received within a hole 28b defined in first jaw 28. Threaded rod 32 passes through an aperture 26a defined in head 26 and a handle 34 is engaged with the second end of threaded rod 32. When handle 34 is rotated in a first direction, the distance between head 26 and first jaw 28 increases. When handle 34 is rotated in a second direction, the distance between head 26 and first jaw 28 decreases. Second jaw 30 may be selectively moved to any desired position along the length of guide bar 24, i.e., second jaw 30 may be positioned a selected distance away from first jaw 28. Second jaw 30 includes a locking mechanism that will enable a user to lock second jaw 30 to guide bar 24 in any desired position. First jaw 28 may also include a similar locking mechanism. First jaw 28 includes a contact pad 28c and second jaw 30 includes a contact pad 30b. First side 18a' of first board 18a is contacted by contact pads 28c of first jaw while second side 18c" of third board 18c is contacted by contact pad 30b, as can be seen in FIG.

Figure 5:
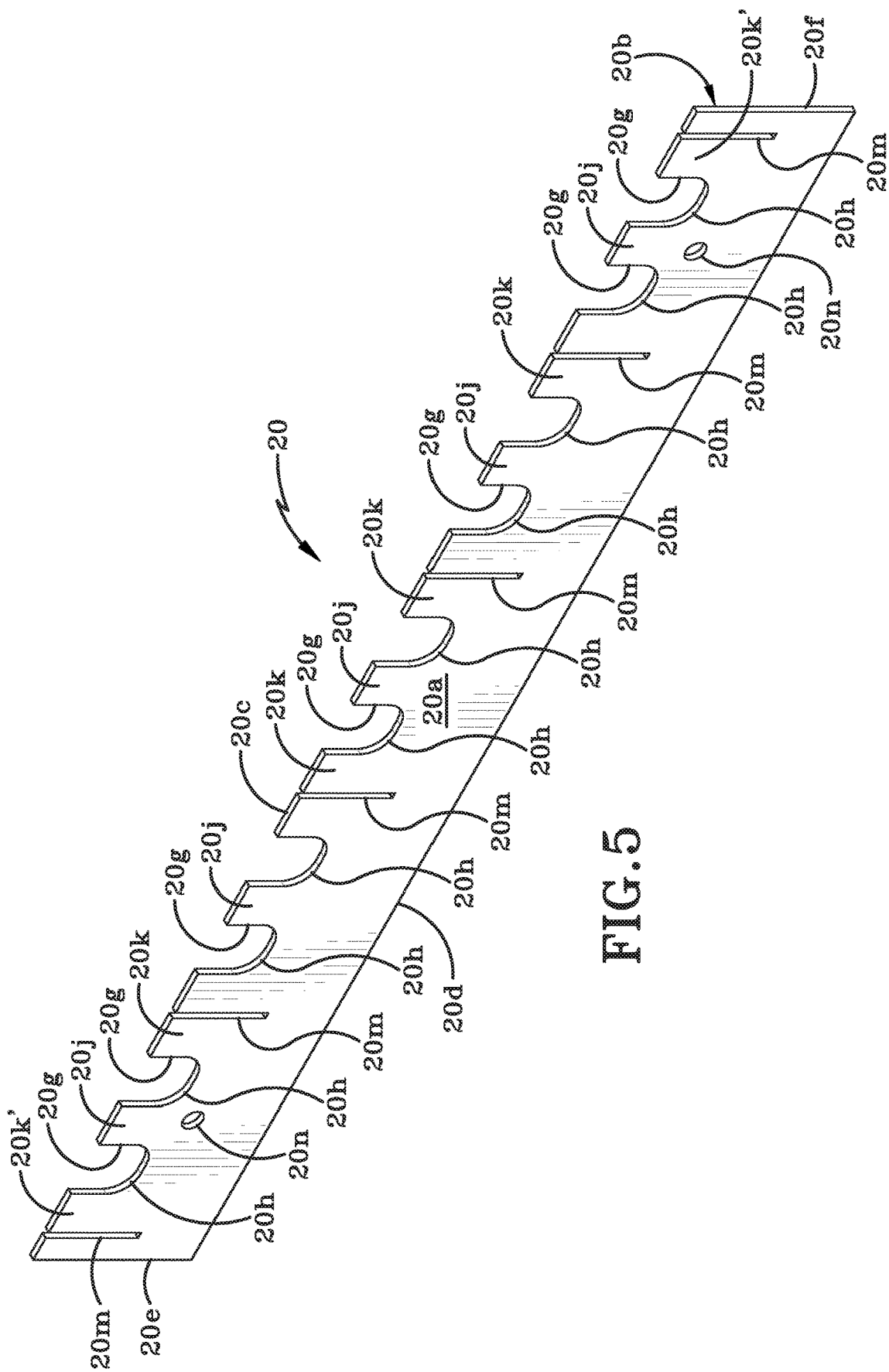
FIG. 5 is an isometric perspective view of a first support member of the support rack.
Figure 6:
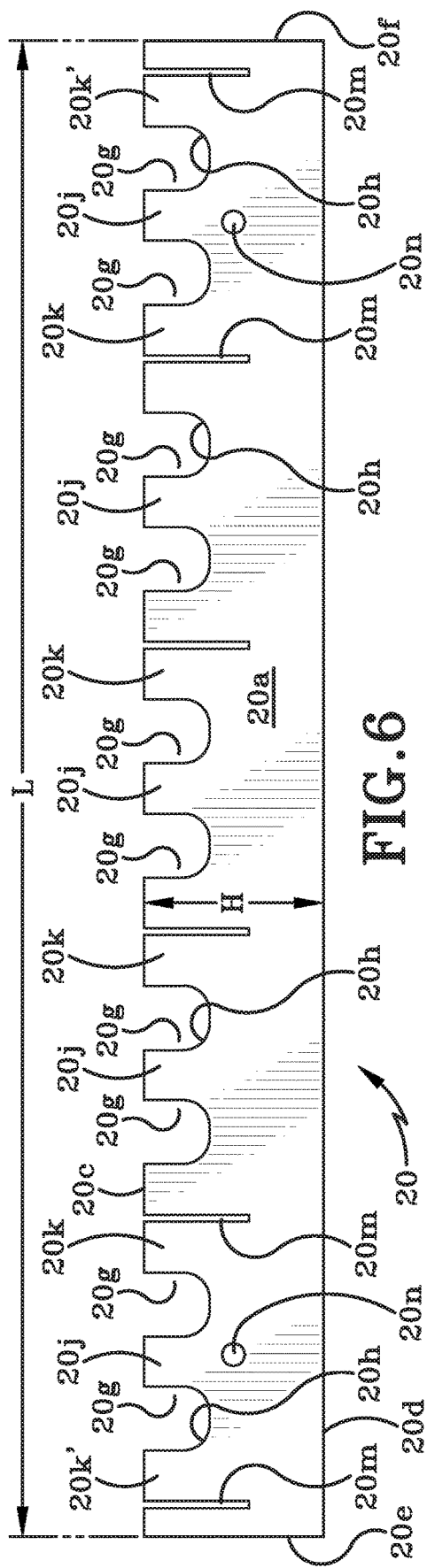
FIG. 6 is a front elevation view of the first support member.

FIGS. 5 and 6 show a single first plate 20 shown on its own. It will be understood that a rear view and a rear perspective view of the first plate 20 will be a mirror image of the front view and the front perspective view shown in FIGS. 5 and 6, respectively. First plate 20 includes a front surface 20a, a back surface 20b, a top edge 20c, a bottom edge 20d, a first end 20e, and a second end 20f. A plurality of U-shaped slots 20g are defined in first plate 20. Each U-shaped slot 20g originates in top edge 20c and extends for a distance downwardly towards bottom edge 20d. Slots 20g terminate a distance upwardly away from bottom edge 20d. Each slot 20g also extends from front surface 20a through to back surface 20b. Each U-shaped slot 20g includes a rounded bottom curve, indicated in FIGS. 5 and 6 by the reference number 20h. Slots 20g are arranged in pairs, with the adjacent slots 20g in each pair being laterally separated from each other by a first tab 20j. Adjacent pairs of slots 20g, 20g are laterally separated from each other by a second tab 20k. Second tab 20k is larger than first tab 20j. The exceptions to this are the end regions of first plate 20; in these locations only a partial second tab 20k' is provided.

It will be noted that the "legs" of the U-shaped slots 20g are substantially at right angles to top edge 20c. In other examples, the legs of the U-shaped slots 20g are oriented at an angle other than right angles relative to top edge 20c.

It should be noted that every U-shaped slot 20g is of substantially the same depth measured from top edge to the bottom of the curve of the U-shape. Additionally, every U-shaped slot 20g is of substantially the same width as measured from leg to the other leg of the U-shape. Furthermore, every U-shaped slots 20g has a substantially identical radius of curvature. It will be understood in other examples differently sized and configured U-shaped slots 20g may be provided in first plate 20. If two identical clamps such as first clamp 14 and second clamp 16 are to be utilized with support rack 12, then at least two pairs of the U-shaped slots in first plates 20 will be substantially identical.

It should further be noted that all the first tabs 20j on first plate 20 are of a substantially constant size. Additionally, all of the second tabs 20k on first plate 20 are of a substantially constant size. The size of the first tab 20j is smaller than the size of the second tab 20k. In other examples, the tabs 20j on first plate 20 may be of a variety of different sizes. Still further, in other examples, the tabs 20k on first plate 20 may be of a variety of different sizes.

FIGS. 5 and 6 also show that a slit 20m is defined in each second tab 20k. Each slit 20m is located generally centrally within the width of the associated second tab 20k. Each slit 20m originates in top edge 20c and extends downwardly for a distance towards bottom edge 20d. All slits 20m terminate a same distance away from bottom edge 20d. It should be noted that the slits 20m terminate closer to bottom edge 20d than do U-shaped slots 20g. Each slit 20m extends from front surface 20a through to back surface 20b of first plate 20. Substantially all slits 20m on first plate 20 are of a substantially constant depth from top edge 20d to the bottom of the slit 20m.

One or more apertures 20n are defined in first plate 20. Apertures 20n may be spaced a distance inwardly from each of top edge 20c and bottom edge 20d. Apertures 20n may be located a distance inwardly from first end 20e or from second end 20f. As shown in FIG. 2, a pair of apertures 20n is defined in each first plate a short distance inwardly from each of the first end and second end thereof.

It should be noted from FIGS. 5 and 6, that bottom edge 20d of first plate 20 is substantially continuous from one end of the plate to the other, i.e., bottom edge 20d from first end 20e to second end 20f is substantially free of any slits, slots or apertures.

Figure 8:
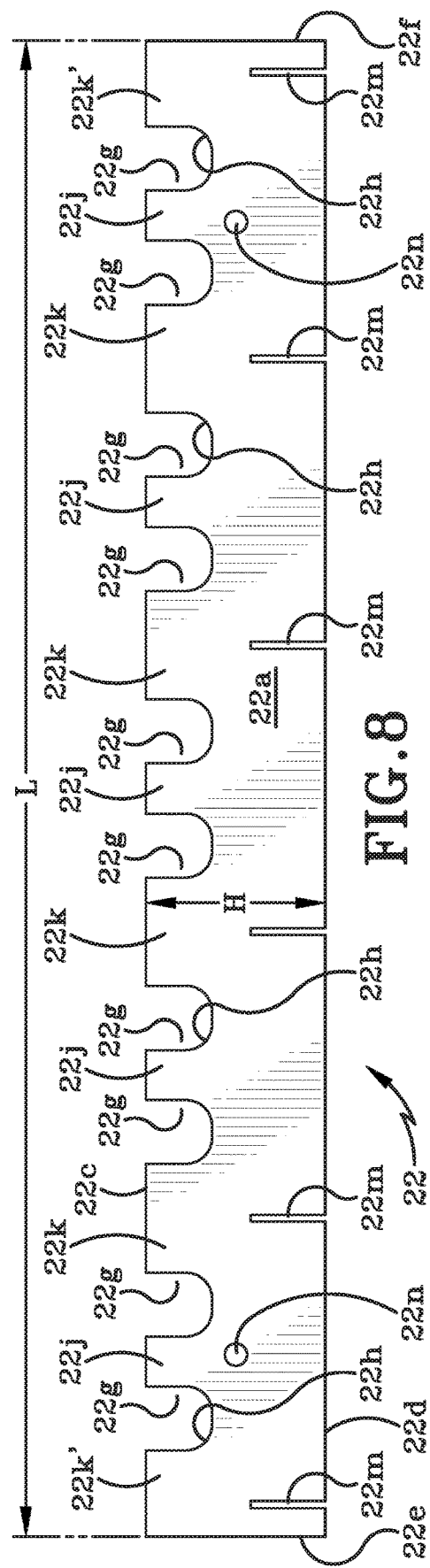
FIG. 8 is a front elevation view of the second support member.
Figure 7:
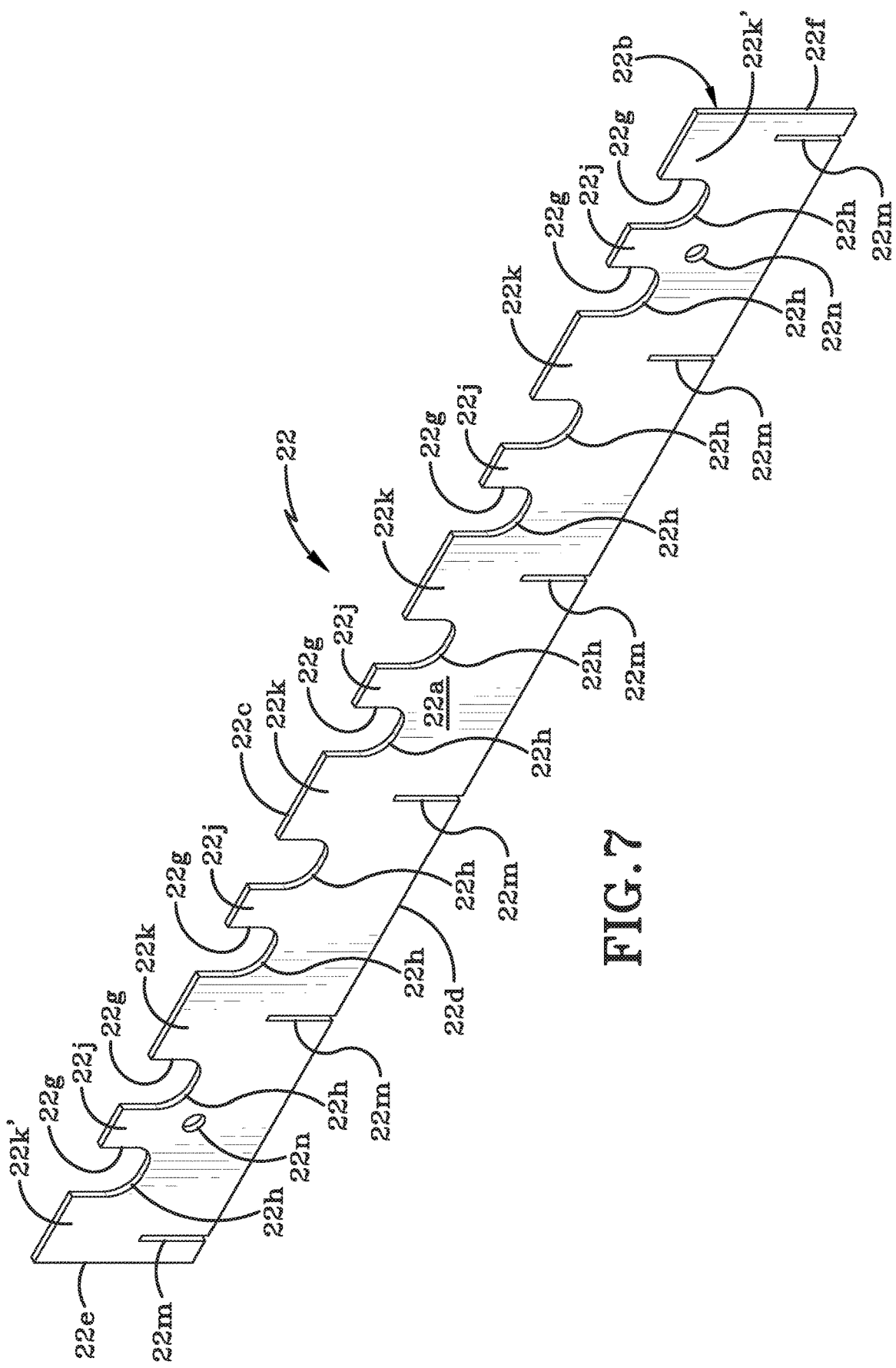
FIG. 7 is an isometric perspective view of a second support member of the support rack.

FIGS. 7 and 8 show a single second plate 22 on its own. It will be understood that the rear view and rear perspective view of the second plate 22 will be a mirror image of the front view and front perspective view shown in FIGS. 7 and 8, respectively. Second plate 22 includes a front surface 22a, a back surface 22b, a top edge 22c, a bottom edge 22d, a first end 22e, and a second end 22f.

A plurality of U-shaped slots 22g is provided in second plate 22. Each U-shaped slot 22g originates in top edge 22c and extends for a distance downwardly towards bottom edge 22d. Slots 22g terminate a distance upwardly away from bottom edge 22d. Each slot 22g also extends from front surface 22a to back surface 22b and is substantially identical in shape and function to the slots 20g in first plate 20. Each U-shaped slot 22g includes a rounded bottom curve, indicated in FIGS. 7 and 8 by the reference number 22h. Slots 22g are arranged in pairs with the adjacent slots 22g in each pair being laterally separated from each other by a first tab 22j. First tab 22j is of substantially the same size as first tab 20j. Adjacent pairs of slots 22g, 22g are laterally separated from each other by a second tab 22k. Second tab 22k is larger than first tab 22j. The exceptions to this are the end regions of second plate 22; in these locations only a partial second tab 22k' may be provided. Seconds tabs 22k are substantially equal in shape and size to second tabs 20k.

FIGS. 7 and 8 also show that a plurality of slits 22m is defined bottom edge 22d of second plate 22. Each slit 22m originates in bottom edge 22d and extends upwardly towards top edge 22c. Slits 22m terminate a distance away from top edge 22c and from the curve 22h at the bottom of U-shaped slots 22g. Each slit 22m extends from front surface 22a through to back surface 22b. Each slit 22d is generally aligned with a midline of one of the second tabs 22k. The exception to this is, again, the portion of second tabs 22k' proximate first end 22e end or proximate second 22f, where the slit 22m is positioned where a midline of a full width second tab 22k would be located. Each slit 22m is smaller in overall height relative to each slit 20m.

One or more apertures 22n may be defined in second plate 22. Apertures 22n are spaced a distance inwardly from each of top edge 22c and bottom edge 22d. Apertures 22n may be located a distance inwardly from first end 22e or from second end 22f. Apertures 22n extend from front surface 22a through to back surface 20b.

FIGS. 6 and 8 show that first plate 20 and second plate 22 are of the same length "L" as each other when measured from first end 20e, 22e to second 20f, 22f. First plate 20 and second plate 22 are also of the same height "H" as measured from top edge 20c, 22c to bottom edge 20d, 22d. These figures also show that slits 20m, 22m, first tabs 20g, 22g, second tabs 20k, 22k and apertures 20n, 20n are located in substantially identical positions along the lengths "L" of first plate 20 and second plate 22.

Figure 4:
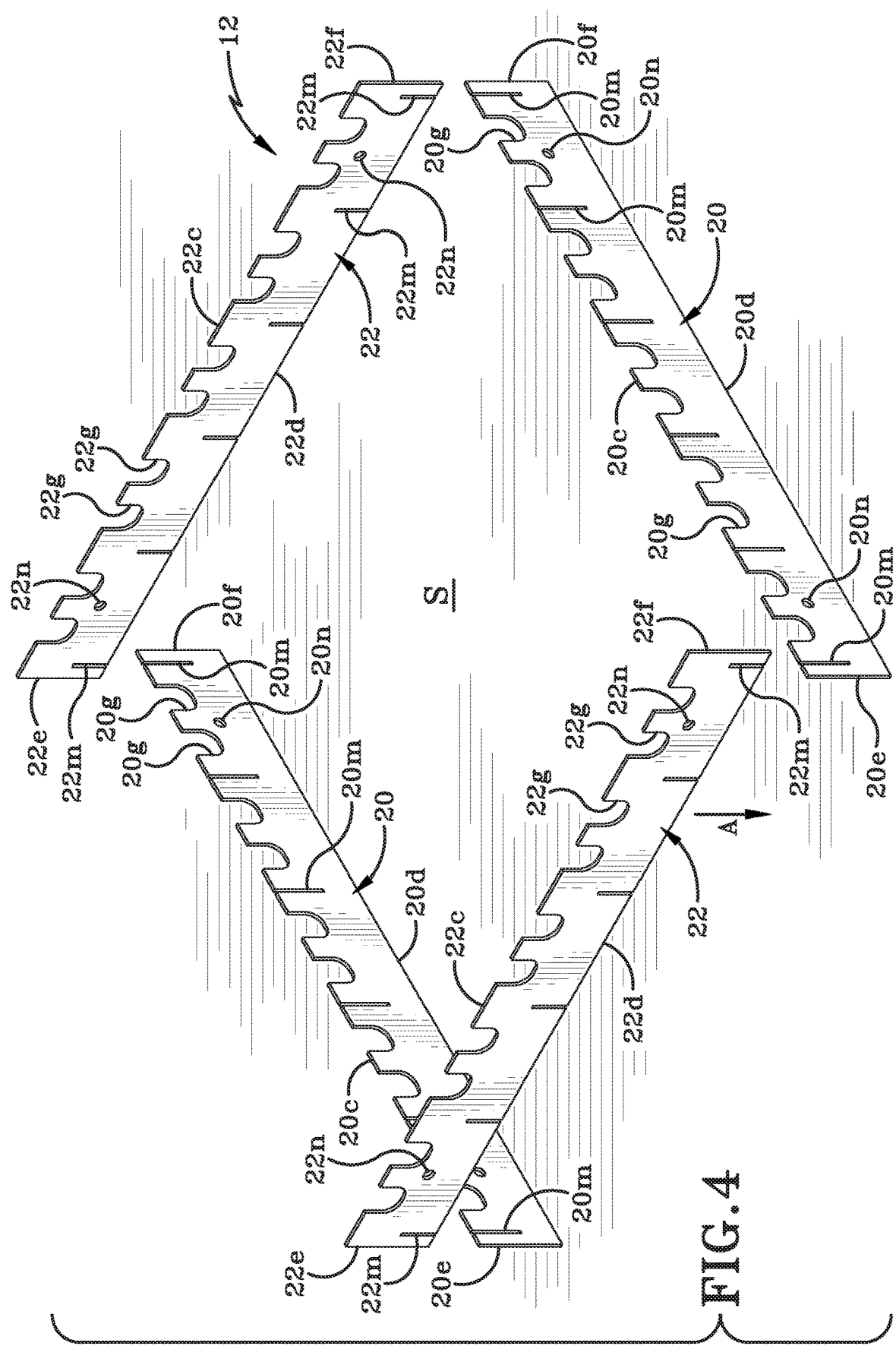
FIG. 4 is an exploded isometric perspective top view of the support rack of FIG. 3.

As can be seen from FIG. 4, when support rack 12 is assembled, the first plates 20 are placed bottom edge 20d down on a flat surface "S". First plates 20 are positioned so that they are laterally spaced apart but aligned with each other. In other words, first ends 20e of the two plates 20 are aligned with each other and second ends 20f of the two plates 20 are aligned with each other. One of the second plates 22 is then engaged with the two first plates 20. In order to configure the frame of support rack 12 as illustrated in FIGS. 1 and 2, the slit 22 closest to first end 22e of second plate 22 with slit 20m closest to first end 20e of one of first plates 20. The slit 22m closest to second end 22f of second plate 22 is then aligned with slit 20m closest to first end 20e of the other of the first plates 20. Second plate 22 is then moved downwardly in the direction "A" towards to two first plates 20 and so that slits 22m proximate first end 22e and second end 22f slide into slits 20m proximate first ends 20e. Second plate 22 is moved downwardly in the direction of arrow "A" until bottom edge 22d thereof is in the same plane as bottom edge 20d of first plates 20 and is resting on surface "S". The other second plate 22 is then engaged with the two first plates 20 in a similar manner proximate the opposite end of the two first plates 20. Once the four plates 20, 20, 22, 22 are all resting on surface "S", the frame is effectively interlockingly engaged and ready for use. Clamps 14, 16 may be engaged therewith as described hereafter.

Figure 10:
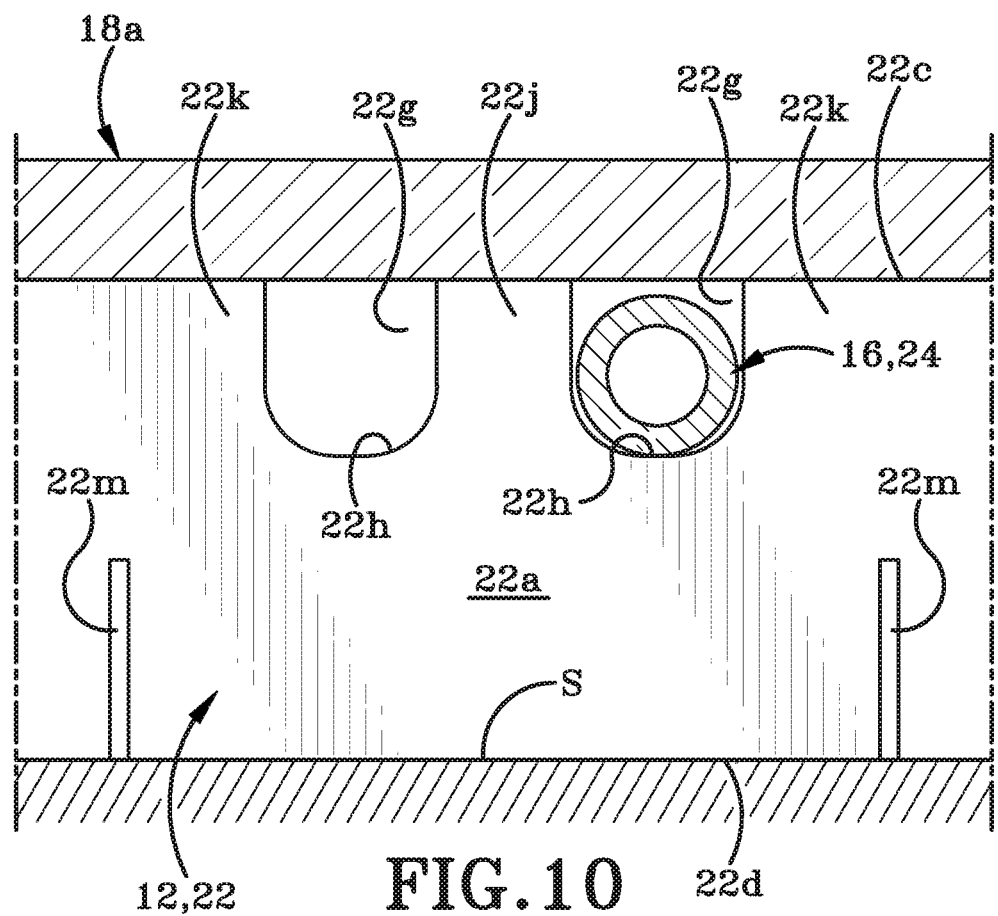
FIG. 10 is an end view of the first end of the support system taken along line 10-10 of FIG. 9.

As is evident from FIGS. 2 and 10, guide bars 24 are straight along their length and generally circular in cross-section. Each guide bar 24 has a curved exterior circumferential surface. The radius of curvature of the circumferential surface is substantially similar to the radius of curvature of curved bottom regions 20h, 22h of U-shaped slots 20g, 22g of first plate 20 and second plate 22, respectively. This can be seen in FIG. 10. Each guide bar 24 is seated within a pair of opposed slots 20g, 20g or 22g, 22g depending on whether the guide bar 24 is oriented between two opposed first plates 20 or two opposed second plates 22. When guide bars 24 are engaged within opposed U-shaped slots 20g or 22g, the curved exterior surface of the guide bar 24 is seated within the associated curved bottom regions 20h or 22h of the slots 20g, 22g of first plates 20 or second plates 22.

Figure 11:
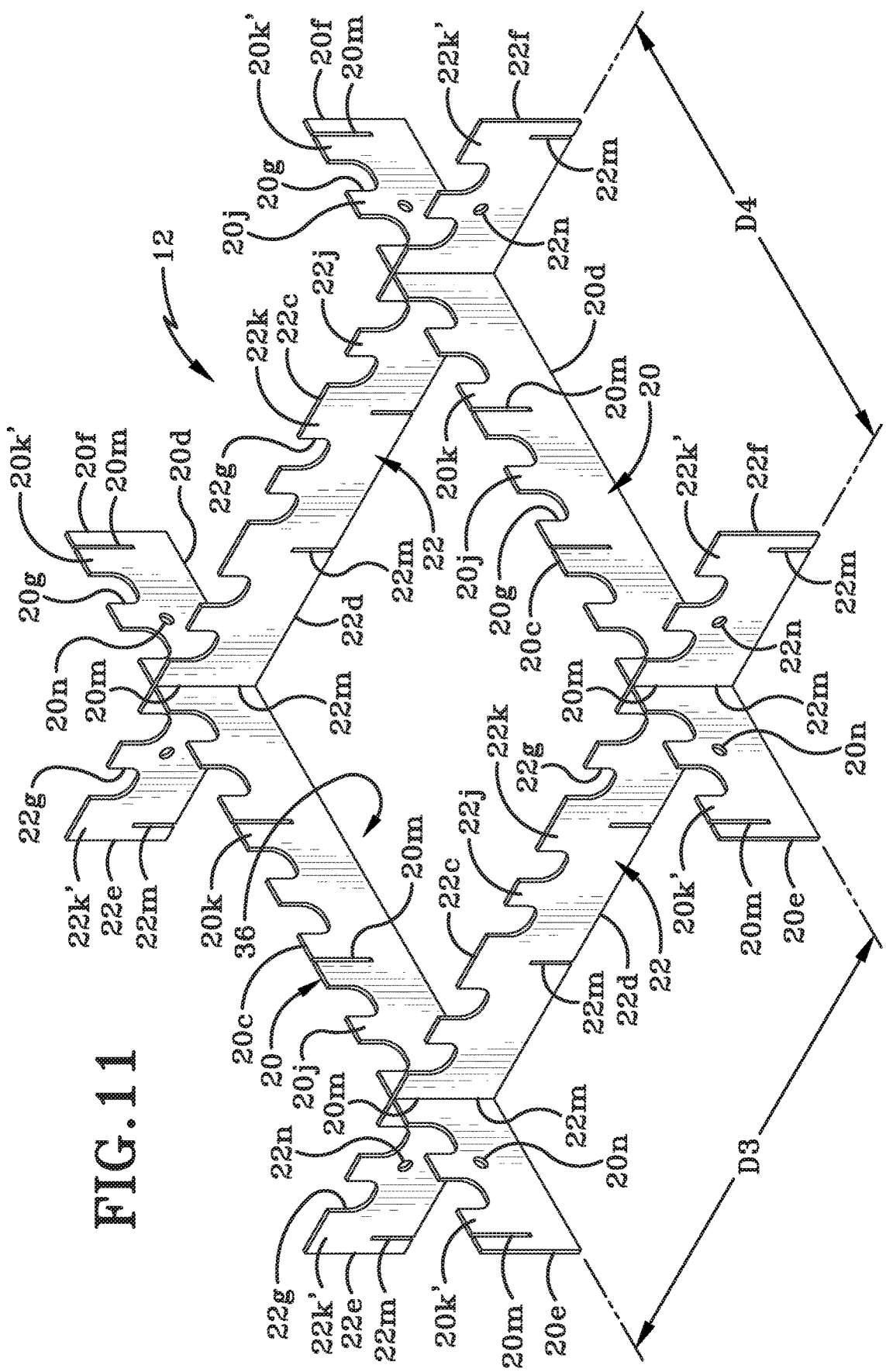
FIG. 11 is an isometric perspective top view of the clamp support system of FIG. 2 shown in an adjusted position.

FIG. 11 is provided to show that the relative size of the space 36 defined by the two first bars 20 and the two second bars 22 may be readily adjusted as desired. FIG. 11 shows that second bars 22 may be engaged with slits 20m that are located a further distance inwardly from first ends 20e and/or second ends 20f of first bars 20. So, the distance "D1" (FIG. 2) may be reduced to "D3". Additionally, slits 22m other than those proximate first end 22e and/or second end 22f of second bars 22 may be utilized when interlocking first and second bars 20, 22. So, the distance "D2" may be reduced to "D4". The user is therefore able to decide the overall dimensions of support rack 12 by simply engaging first and second bars 20, 22 with each other using any selected slits 20m, 22m. Support rack 12 may therefore be configured in a range of different configurations to suit the specific first clamp 14 and second claim 16 that the craftsman wishes to utilize.

It will further be understood that the overall lengths "L" of the first bars 20 and second bars 22 may be different from each other so that a differently shaped support rack 12 may be formed by interlocking first bars 20 and second bars 22 together. The attached figures show that the first bars 20 and second bars 22 are of substantially the same length and may therefore be used to form support racks 12 that are square or rectangular in shape. However, in other instances, the first bars, for example, may be longer in length than the second bars and in this instance, the first and second bars may more typically be used to form rectangular support racks.

The apertures 20n, 22n may be used for a variety of purposes, including but not limited to hanging the first bar 20 or second bar 22 on a nail or other support extending outwardly from a vertical wall for storage purposes.

A method of clamping a workpiece 18 utilizing the clamp support system 10 shown in FIGS. 1-11 includes as a first step, the set-up of the support rack 12. A bottom edge 20d of a first plate 20 of a support rack 12 is placed on a flat surface "S" (FIG. 9); orienting a second plate 22 above the first plate 20 and at right angles to the first plate 20; aligning a slit 22m in a bottom edge 22d of the second plate 22 with a slit 20m in a top edge 20c of the first plate 20; pushing the second plate 22 downwardly toward the flat surface "S" and thereby interlocking the first and second plates 20, 22 together. A bottom edge 20d of an additional first plate 20 is positioned on the flat surface "S". The method further includes positioning the interlocked first and second plates 20, 22 above the additional first plate 20 so that the first plate 20 and the additional first plate 20 are oriented substantially parallel to each other and the second plate 22 is oriented generally at right angles to the first plate 20 and the additional first plate 20. The method includes aligning an additional slit 22m in the bottom edge 22d of the second plate 22 with a slit 20m in a top edge 20c of the additional first plate 20 and then pushing the interlocked first and second plates 20, 22 downwardly toward the flat surface "S" until the additional first plate 20 is interlocked to the interlocked first and second plates 20, 22. The method may further comprise aligning an additional second plate 22 vertically above the interlocked first and second plates 20, 22 and additional first plate 20 so that the additional second plate 22 is substantially parallel to the second plate 22. A pair of slits 22m defined in a bottom edge 22d of the additional second plate 22 is aligned with another slit 20m in the first plate 20 and another slit 20m in the additional first plate 20. The additional second plate 22 is pushed downwardly toward the flat surface "S" until the additional second plate 22 is interlocked with the interlocked first and second plates 20, 22 and additional first plate 20.

It will be understood that in an alternative method of assembling support rack 12, the two first plates 20, 20 are placed with the bottom edges 20d in contact with a flat surface "S". The two first plates 20 are oriented parallel to each other and spaced a distance apart from each other. A second plate 22 is positioned at right angles to the first plates 20 and above the same. In particular, a pair of spaced-apart slits 22m on second plate 22 are aligned with a slit 20m on one first plate 20 and with another slit 20m on the other first plate 20. The second plate 22 is pushed downwardly so that slits 22m, 20m interlock and engage the plates 20, 20, 22 together. An additional second plate 22 will be engaged with the interlocked first and second plates 20, 20, 22 in the same manner. The four plates 20, 20, 22, 22 will form the support rack 12.

The craftsman will also determine what type of workpiece 18 is to be clamped either before or after formation of support rack 12 as described above and may therefore select the spacing between first plates 20 and/or the spacing of second plates 22, accordingly. Adjustments to the configuration of support rack 12 may be made by simply disengaging one or more first plates 20 and/or second plates 22 and repositioning them to form a slightly differently shaped frame that suits the type of workpiece 18 that is to be clamped in support rack 12. For example, the craftsman made decide he or she simply needs to clamp a single board, such as first board 18a (FIG. 1), into support rack 12 to perform some type of woodworking task such as drilling a hole from an upper surface through to a lower surface thereof. In another instance, the craftsman may determine that he or she wishes to glue two boards, such as first board 18a and second board 18b, or second board 18b and third 18c, in a side-by-side configuration. In yet other instances, the craftsman may decide to glue three boards, first board 18a, second board 18b, and third board 18c together in a side-by-side configuration as illustrated in FIG. 1.

If the craftsman decides to glue first board 18a and second board 18b to each other, he or she will apply an adhesive to one or both of the second side 18a" of first board 18a and first side 18b' of second board 18b. The craftsman will place a guide bar 24 (FIGS. 2 and 9) of each of the first clamp 14 and second clamp 16 into a different pair of laterally aligned slots 22g (or a pair of longitudinally aligned slots 22) in support rack 12. The first and second clamps 14, 16 will be spaced a distance away from each other in support rack 12. The first board 18a and second board 18b will be placed on top of the spaced-apart first board 18a and second board 18b. In particular, the first board 18a and second board 18b will be oriented at right angles to guide rails 24.

The following steps will be undertaken for each of the first and second clamp 14, 16 but will be described with respect to first clamp 14 only. The craftsman will position first board 18a on top of the spaced-apart guide rails 24 in such a way that first side 18a' of first board 18a will contact first jaw 28 of first clamp 14. The craftsman may then activate one or both of the first jaw 28 and second jaw 30; moving one or both of the first jaw 28 and second jaw 30 inwardly toward the other of the first jaw 28 and the second jaw 30 and thereby reducing the distance between first jaw 28 and second jaw 30. The contact pad 28c of first jaw 28 is moved by rotating handle 34 in the appropriate one of a first direction and a second direction. The second jaw 30 is moved by disengaging locking mechanism and sliding the second jaw 30 along guide rail 24. The inward movement of one or both of first jaw 28 and second jaw is continued until the second side 18b" of second board 18b is in contact with second jaw 30. Second jaw 30 will be locked in placed on guide rail 24 by re-engaging the locking mechanism. The craftsman will continue to rotate handle 34 in the selected one of the first direction and second direction to continue moving first jaw 28 inwardly toward second jaw 30. The continued inward movement of first jaw 28 towards second jaw 30 will apply a compressive clamping force to first and second boards 18a, 18b. When continued inward movement of first jaw is effectively no longer possible without damaging first and second boards 18a, 18b, the craftsman will stop rotating handle 34. A locking mechanism on first jaw 28 may be engaged to ensure there is no accidental separation of first board 18a and second board.

The support rack 12 will then remain undisturbed for a predetermined period of time. This period of time is allowed to ensure that any adhesive previously applied between first board 18a and second board 18b dries and thus secures the first and second boards 18a, 18b together. Once the adhesive has dried and the first and second boards 18a, 18b are secured to each other, the craftsman will disengage the associated locking mechanism and will activate one or both of first jaw 28 and the second jaw 30 to move them outwardly away from each other. The first jaw 28 is moved outwardly by rotating handle 34 in the opposite direction to the previously selected first direction or second direction. The second jaw 30 is moved by sliding the same along guide rail 24 and toward the closest first or second plate 20, 30 in which guide rail 24 is seated. The application of compressive, clamping force to first board 18a and second board 18b will then cease and the completed end product workpiece 18 may be removed form support rack 12.

Figure 12:
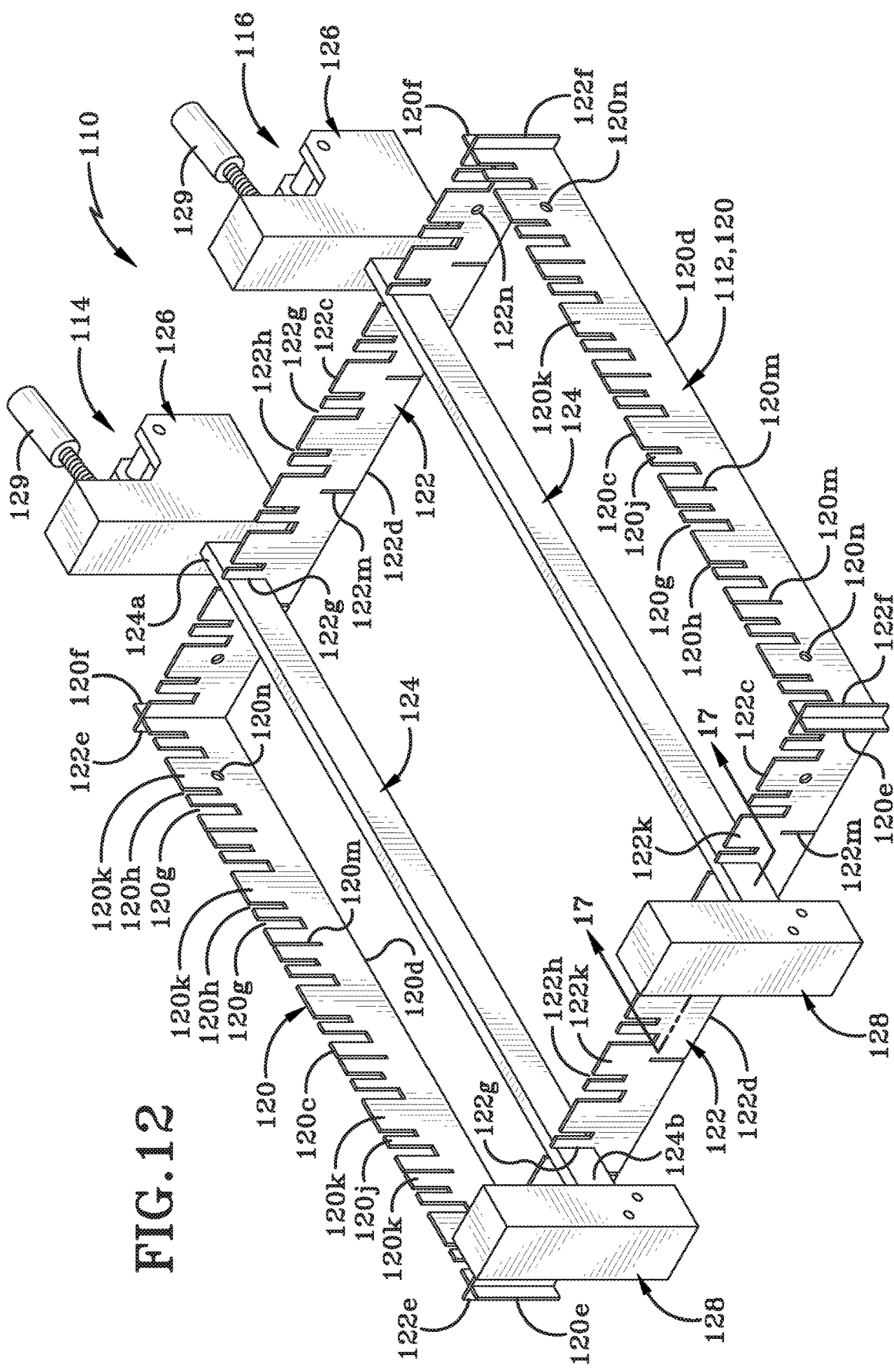
FIG. 12 is an isometric perspective top view of a second embodiment of a clamp support system in accordance with an aspect of the present invention, with the clamp support system shown on its own.
Figure 18:
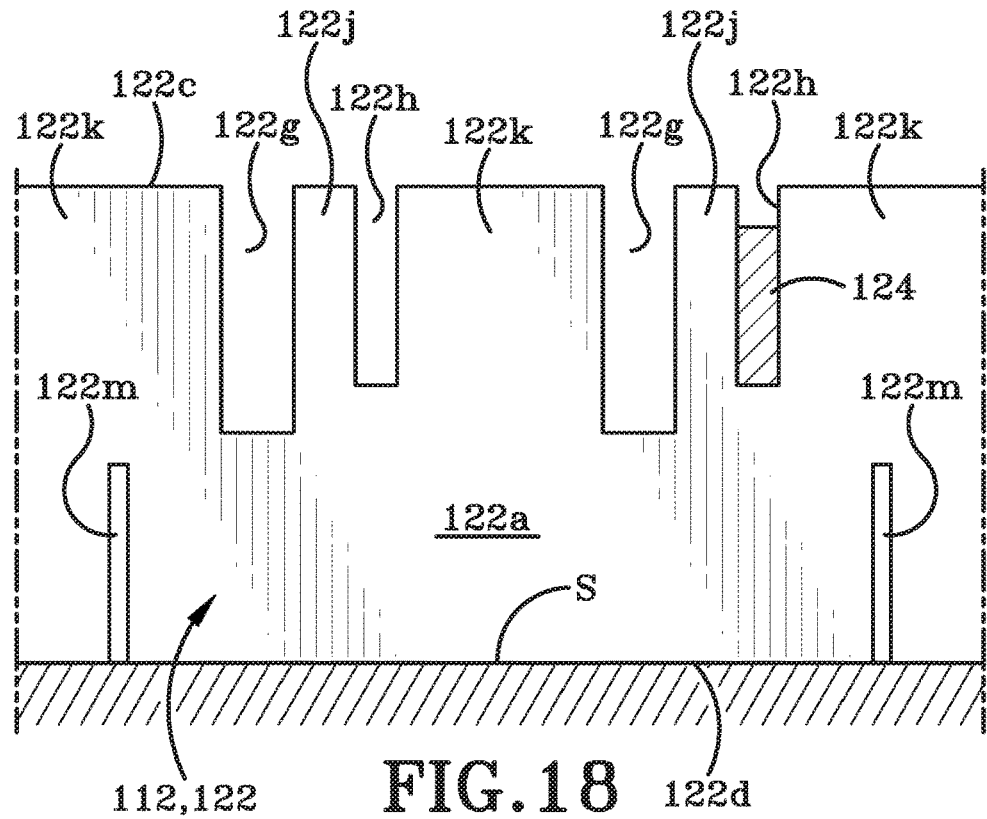
FIG. 18 is an enlarged front elevation view of a section of the second support member showing a guide bar of a clamp engaged therewith.

FIG. 12 through to FIG. 18 show a second embodiment of a clamp support system in accordance with the present invention, generally indicated at 110. Clamp support system 110 is substantially similar in structure and function to clamp support system 10 except for a few matters which will be discussed hereafter. Clamp support system 110 comprises a support rack 112, a first clamp 114, and a second clamp 116. Clamp support system 110 is of a similar structure and function to clamp support system 10 in that it comprises a support rack 112 which is comprised of a pair of first plates 120 and a pair of second plates 122 that interlock with each other. Certain parts of the first plates 120 and second plates 122 are differently configured to first plates 20 and second plates 22 but they function in substantially the same manner as first and second plates 20, 22. First plates 120 are identical to each other and second plates 122 are identical to each other but first and second plates 120, 122, while similar, are not identical to each other. First plates 120 and second plates 122 are configured to interlockingly engage each other to form a frame. The interlocking engagement between first plates 120 and second plates 122 is sufficient to hold the shape of frame without the need for any fasteners or other types of securement mechanism. First plates 120 and second plates 122 are designed so that the size of the support rack 112 may be longitudinally or laterally adjusted so that the support rack 112 can be differently configured to suit the type of workpiece 18 that is to be clamped. Additionally, the first clamp 114 and second clamp 116 that are utilized with support rack 112 are identical to each other but are differently configured to first clamp 14 and second clamp 16.

First clamps 114 include a guide bar 124, a head 126 and a jaw 128. Guide bar 124 is illustrated as being substantially straight along its length and generally rectangular in cross-section. Head 126 comprises a block that is operatively engaged at a first end 124a of guide bar 124. An adjustment/locking mechanism 129 is engaged with head 126 and is operative to move one or both of head 126 and jaw 128 relative to each other and thereby to jaw 128. Jaw 128 is operatively engaged with second end 124b of guide bar 124. Adjustment/locking mechanism 129 may be any suitable mechanism that moves head 126 and jaw 128 toward each other when actuated in a first manner and moves head 126 and jaw 128 away from each other when actuated in a second manner.

Figure 13:
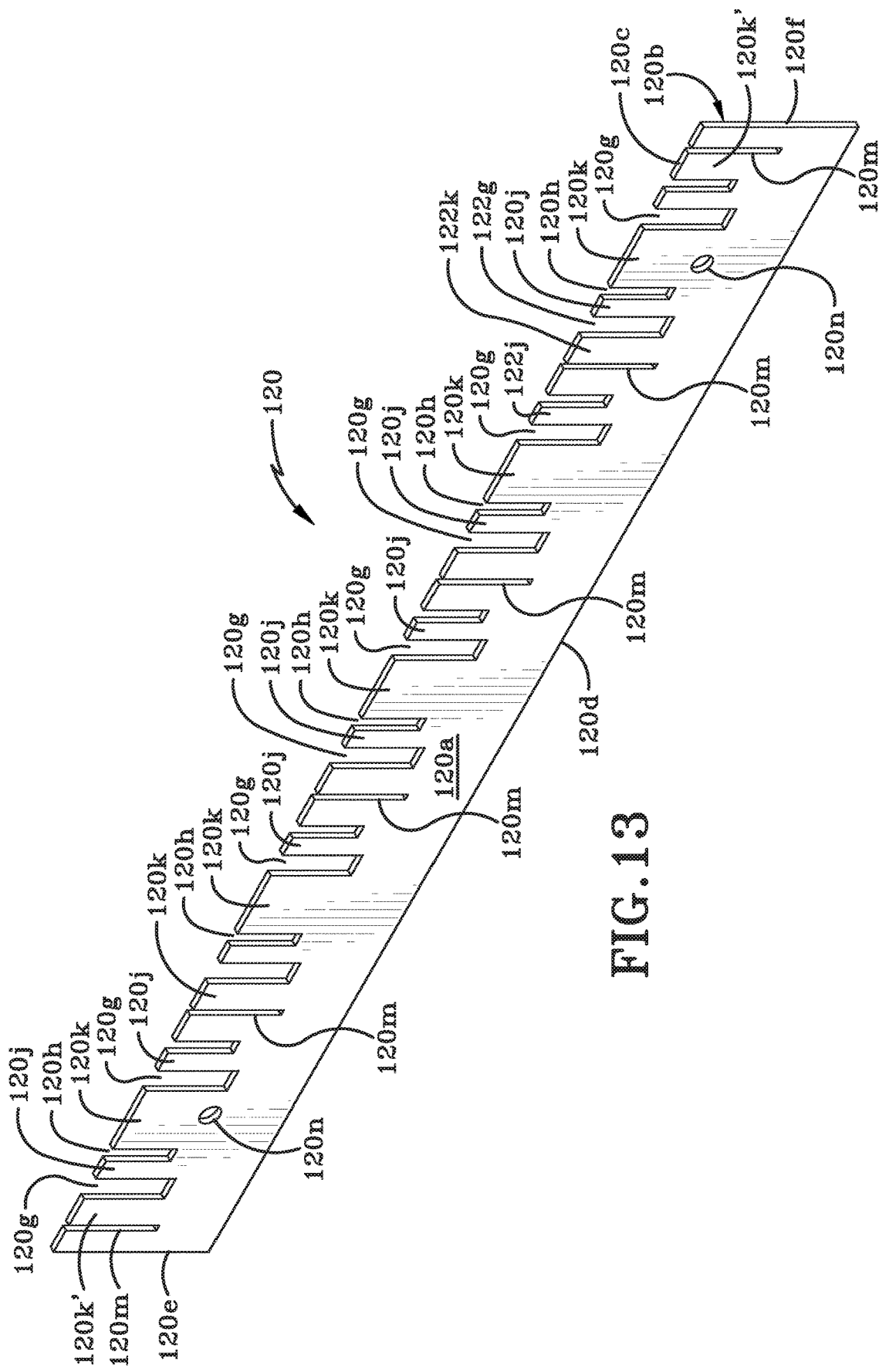
FIG. 13 is an isometric perspective view of a first support member of the support rack of FIG. 12.

FIGS. 13 and 14 show a single first plate 120 in accordance with an aspect of the present disclosure. It will be understood that a rear view and rear perspective view of the first plate 120 will be a mirror image of the front view and front perspective view shown in FIGS. 13 and 14, respectively. First plate 120 includes a front surface 120a, a back surface 120b, a top edge 120c, a bottom edge 120d, a first end 120e, and a second end 120f. A plurality of first slots 120g and a plurality of second slots 120h are defined in first plate 120. Each first slot 120g and each second slot 120h originates in top edge 120c and extends for a distance downwardly towards bottom edge 120d. Slots 120g, 120h terminate a distance upwardly away from bottom edge 120d. Each slot 120g, 120h also extends from front surface 120a through to back surface 120b. Each first slot 120g and each second slot 120h is generally rectangular in shape when first plate 120 is viewed from the front or back. First slot 120g is, however, wider and deeper than second slot 120h. This can most readily be seen in FIG. 14 where the width of first slot 120g is indicated by the reference character "W1" and the width of second slot 120h is indicated by the reference character "W2". "W2" is smaller than "W1". First slot 120g is also shown in FIG. 14 as having a depth 'H" while second slot 120h is shown as having a depth "H2". Depth "H2" is smaller than depth "H1". Each first slot 120g is therefore of a first size (having a width "W1" and a depth "H1") and each second slot 120h is of a second size (having a width "W2" and a depth "H2").

Referring still to FIG. 14, it can be seen that slots 120g, 120h are arranged in pairs, with the adjacent slots 120g, 120h in each pair being longitudinally separated from each other by a first tab 120j. Adjacent pairs of slots 120g, 120h/120g, 120h are longitudinally separated from each other by a second tab 120k. Second tab 120k is larger than first tab 120j. The exceptions to this pattern of slots are the two end regions of first plate 120; in these locations only a partial second tab 120k' is provided. It should also be noticed that the slots 120g, 120h are arranged in an alternating pattern of a wider and deeper slot 120g followed by narrower and shallower slot 120h, followed by another wider and deeper slot 120g, followed by another narrower and shallower slot 120h. It will be understood, however, that any pattern of slots 120g, 120h may be utilized FIGS. 13 and 14 also show that a slit 120m is defined in alternating second tabs 120k of each first plate 120. A slit 120m is defined in each second tab 120k'. Each slit 120m is located generally centrally within the width of the associated second tab 120k. Each slit 120m originates in top edge 120c and extends downwardly towards bottom edge 120d. Slits 120m terminate a distance away from bottom edge 120d. It should be noted that the slits 120m terminate closer to bottom edge 120d than do first slots 120g. Each slit 120m extends from front surface 120a through to back surface 120b. It should be noted from FIGS. 13 and 14, that bottom edge 120d of first plate 120 is substantially continuous and substantially uninterrupted by any slits, slots, or apertures.

One or more apertures 120n may be defined in first plate 120. Apertures 120n are spaced a distance inwardly from each of top edge 120c and bottom edge 120d. Apertures 120n may further be located a distance inwardly from the associated first end 120e or second end 120f of first plate 120. Apertures 120n may serve the same function as apertures 20n, 22n in plates 20, 22.

Figure 15:
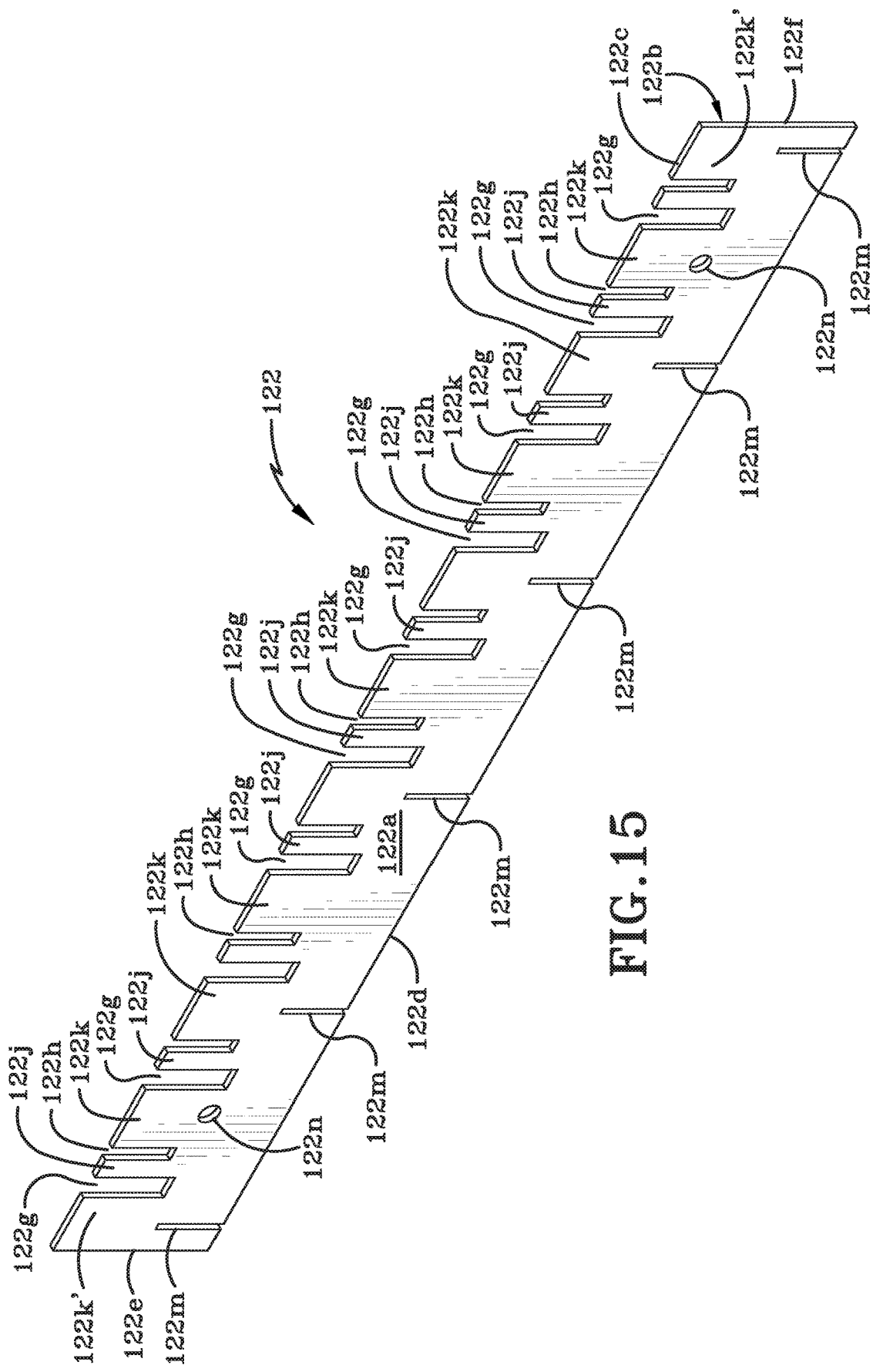
FIG. 15 is an isometric perspective view of a second support member of the support rack of FIG. 12.

FIGS. 15 and 16 show a single second plate 122. It will be understood that a rear view and rear perspective view of the second plate 122 will be a mirror image of the front view and front perspective view shown in FIGS. 15 and 16, respectively. As is evident from FIGS. 14 and 16, second plate 122 is generally of the same length "L" as first plate 120. Additionally, first plate 120 and second plate 122 may be of generally the same height "H".

Second plate 122 includes a front surface 122a, a back surface 122b, a top edge 122c, a bottom edge 122d, a first end 122e, and a second end 122f. A plurality of first slots 122g and a plurality of second slots 122h are provided in second plate 122. The first slots 122g and second slots 122h in second plate 122 are substantially identical in structure and function to the first slots 122g and second slots 122h in first plate 120. Each first slot 122g and each second slot 122h originates in top edge 122c and extends for a distance downwardly towards bottom edge 122d. Slots 122g, 122h terminate a distance away from bottom edge 122d. Each slot 122g, 122h also extends from front surface 122a to back surface 122b. Each first slot 122g and each second slot 122h is generally rectangular in shape when second plate 122 is viewed from the front or back. First slot 122g is wider and deeper than second slot 122h. This can most readily be seen in FIG. 16 where the width of first slot 122g is indicated by "W1" and the width of second slot 122h is indicated by "W2", with "W2" being smaller than "W1". First slot 122g is also shown having a depth 'H1" and second slot 122h is shown as having a depth "H2", with "H2" being smaller than "H1". Slots 122g, 122h are arranged in pairs, with the adjacent slots 122g, 122 in each pair being longitudinally separated from each other by a first tab 1122j. Adjacent pairs of slots 122g, 122h/122g, 122 are longitudinally separated from each other by a second tab 122k. Second tab 122k is larger than first tab 122j. The exceptions to this are proximate the end regions of second plate 122; in these locations only a partial second tab 122k' is provided.

FIGS. 15 and 16 also show that a slit 122m is defined in bottom edge 122d of second plate 122 in regions that are located opposite alternating second tabs 122k. Each slit 122m is located opposite a generally central region of the width of the associated second tab 122*k*. A slit 122*m* is also defined in the region of bottom edge 122*d* opposite each second tab 122*k*'. Each slit 122*m* originates in bottom edge 122*d* and extends upwardly towards top edge 122*c*. Slits 122*m* terminate a distance away from top edge 122*c* and a distance downwardly from the lowermost region of each first slot 122*g*. Each slit 122*m* extends from front surface 122*a* through to back surface 122*b*.

One or more apertures 122*n* are defined in second plate 122. Apertures 122*n* are spaced a distance inwardly from each of top edge 122*c* and bottom edge 122*d*. Apertures 122*n* are located a distance inwardly from first end 122*e* or from second end 122*f* and serve the same purpose as apertures 22*n*.

It will be understood that support rack 112 will be assembled and used in a substantially similar manner to support rack 12 and therefore the interlocking engagement of first plates 120 with second plates 122 will not be further described herein but should be understood to be substantially identical to the interlocking engagement of first plates 20 and second plates 22. The craftsman will decide whether to engage a guide bar 124 of a clamp 114 or 116 in opposed and aligned slots 122*g* or 122*h*. The selection will be based upon the configuration of the guide bar 124 in question as described hereafter.

Figure 17:
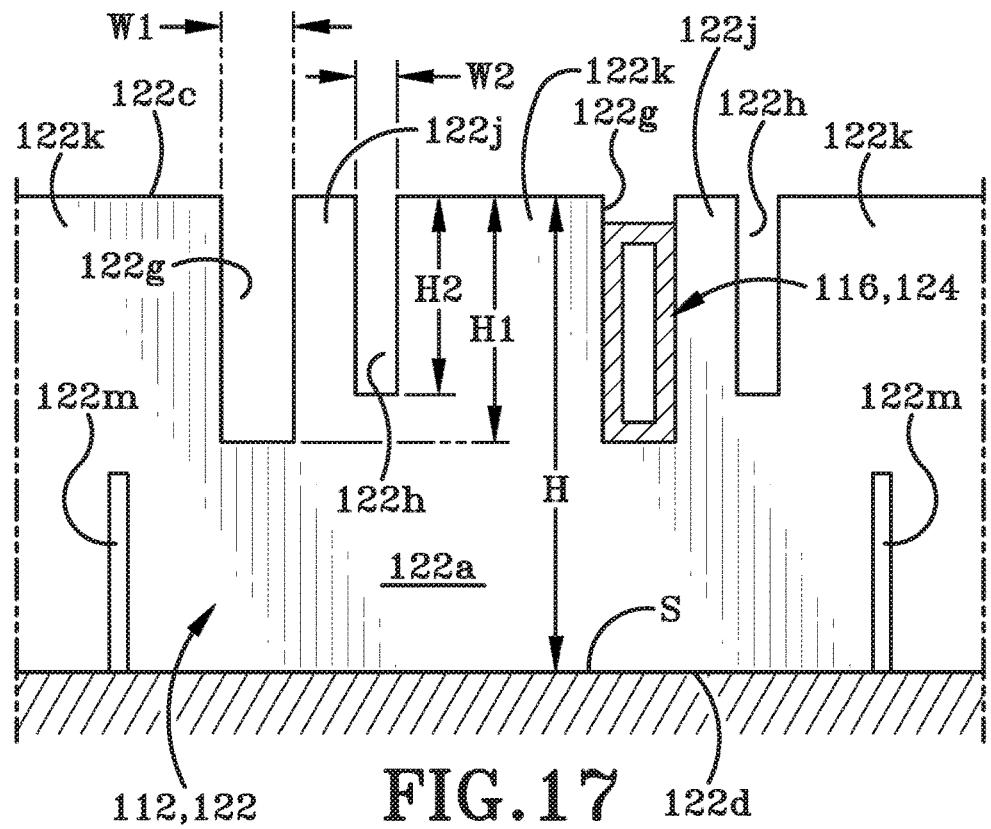
FIG. 17 is an enlarged front elevation view of a section of the first support member showing a guide bar of a clamp engaged therewith.

FIGS. 17 and 18 show a portion of second plate 122 that is being used to support guide bar 124 therein. FIG. 17 shows that guide bar 124 is substantially hollow and configured to be received in one of the first slots 122*g*. The first slots 122*g* are selected when the cross-sectional shape of guide bar 124 is of a height and width than is similar to first slot 122*g*. It should be understood that guide bar 124 will be seated in two opposed and aligned first slots 122*g* in a similar manner to how guide bar 24 is seated in two opposed and aligned U-shaped slots 22*g* of first and second plates 20, 22. The guide bar 124 that is seated in first slots 122*g* may be solid instead of hollow.

FIG. 18 shows a solid guide bar 124 received in one of the second slots 122*h*. The second slots 122*h* are selected when the cross-sectional shape of guide bar 124 is of a height and width than is closer to the height and width of second slot 122*h*. Guide bar 124 will be seated in two opposed and aligned second slots 122*h* in this instance. The guide bar 124 that is seated in second slots 122*h* may be hollow instead of solid.

Once first and second plates 120, 122 have been interlocked with each other to form a desired shape support rack 112, first and second clamps 114, 116 may be engaged therewith by the craftsman selecting the appropriate pair of opposed and aligned slots 122*g*, 122*h* that will receive guide rails 124. One or more boards, such as first board 18*a*, second board 18*b*, and third board 18*c* will be placed onto the upper surfaces of guide rails 124 and between head 126 and jaw 128. In particular, first side 18*a*' of first board 18*a* may be placed in contact with an interior surface of jaw 128 and so that a bottom surface of first board 18*a* rests on the upper surface of guide rails 124. An adhesive may be applied to first and second surfaces 18*b*' and 18*b*" of second board 18*b* and a lower surface of second board 18*b* may be placed on guide rails 124 with first side surface 18*b*' in a side-by-side configuration and in abutting contact with second side 18*a*" of first board 18*a*. If desired, the ends of the first and second boards 18*a*, 18*b* may be aligned with each other. An adhesive may be applied to a first surface 18*c*' of a third board 18*c*, the lower surface of third board 18*c* may be placed onto guide rails 124, and the third board 18*c* may be positioned adjacent the second board 18*b* with the first surface 18*c*' placed in abutting contact with second surface 18*b*". The actuator 129 operatively engaged with head 126 is then activated to bring one or both of head 126 and jaw 128 inwardly toward each other and to move head 126 into contact with second surface 18*c*". The jaw 128 and head 126 apply a horizontally-oriented compressive force to the first, second, and third boards 18*a*, 18*b*, and 18*c*. The compressive force is maintained until the adhesive between the boards dries. The actuator 129 is then disengaged and the workpiece may be removed from the support rack 12.

It will be understood by those of ordinary skill in the art that instead of provided two substantially identical U-shaped slots 20*g*, 22*g* in each pair of adjacent slots in first plate 20 and second plate 22, first plate 20 and second plate 22 may be fabricated similar to first plate 120 and second plate 122 to have two dissimilarly sized U-shaped slots formed therein in a similar manner to the dissimilarly sized rectangular slots 122*g*, 122*h*.

It will further be understood by those of ordinary skill in the art that first plates and second plates 120, 122 may be provided with two adjacent slots in each pair that are of substantially the same shape and size instead of having one larger slot and one smaller slot like slots 120*g*, 120*h*, and 122*g*, 122*h*.

Still further, and as will be described hereafter, first plate and second plate may be provided with one U-shaped slot alongside one rectangularly-shaped slot. In another example, two U-shaped slots of dissimilar sizes may be alternated with two rectangularly-shaped slots of dissimilar sizes. Still further, instead of providing U-shaped or rectangular slots in pairs, first and second plates may instead include slots (U-shaped or rectangular) that are evenly spaced a regular distance apart from each other along the length "L" of the associated first plate or second plate or are grouped in numbers greater than two slots.

Figure 19:
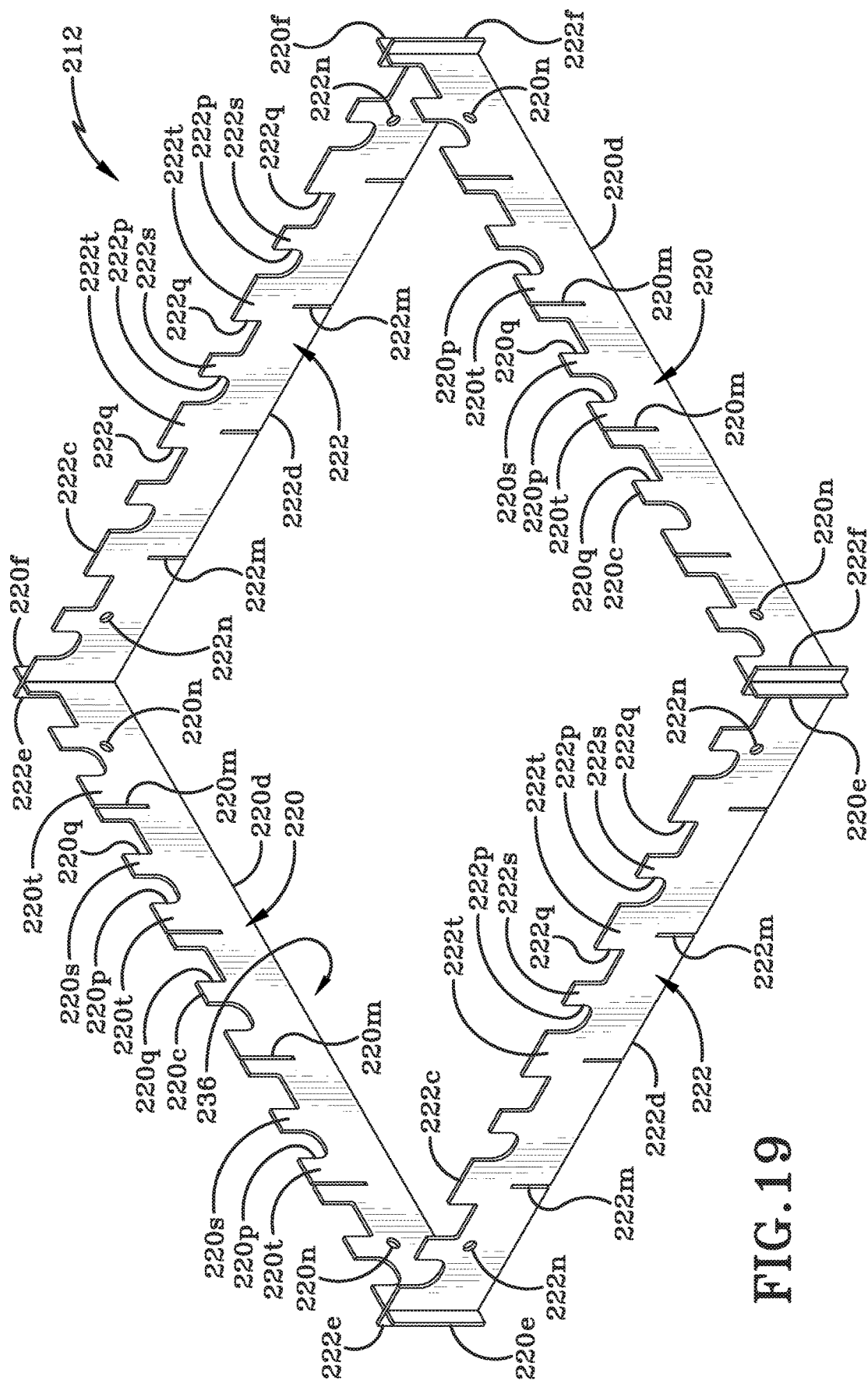
FIG. 19 is an isometric perspective top view of a third embodiment of a support rack in accordance with an aspect of the present disclosure shown arranged in an exemplary first configuration.

Referring now to FIGS. 19 through to 34 there is shown a third embodiment of a support rack 212 that may be utilized as part of a clamp support system in a similar way to support racks 12 and 112. Support rack 212 comprises a pair of first plates 220 and a pair of second plates 222 that are interlockingly engaged with each other in a similar fashion to first and second plates 20, 22 or first and second plates 120, 122.

Figure 20:
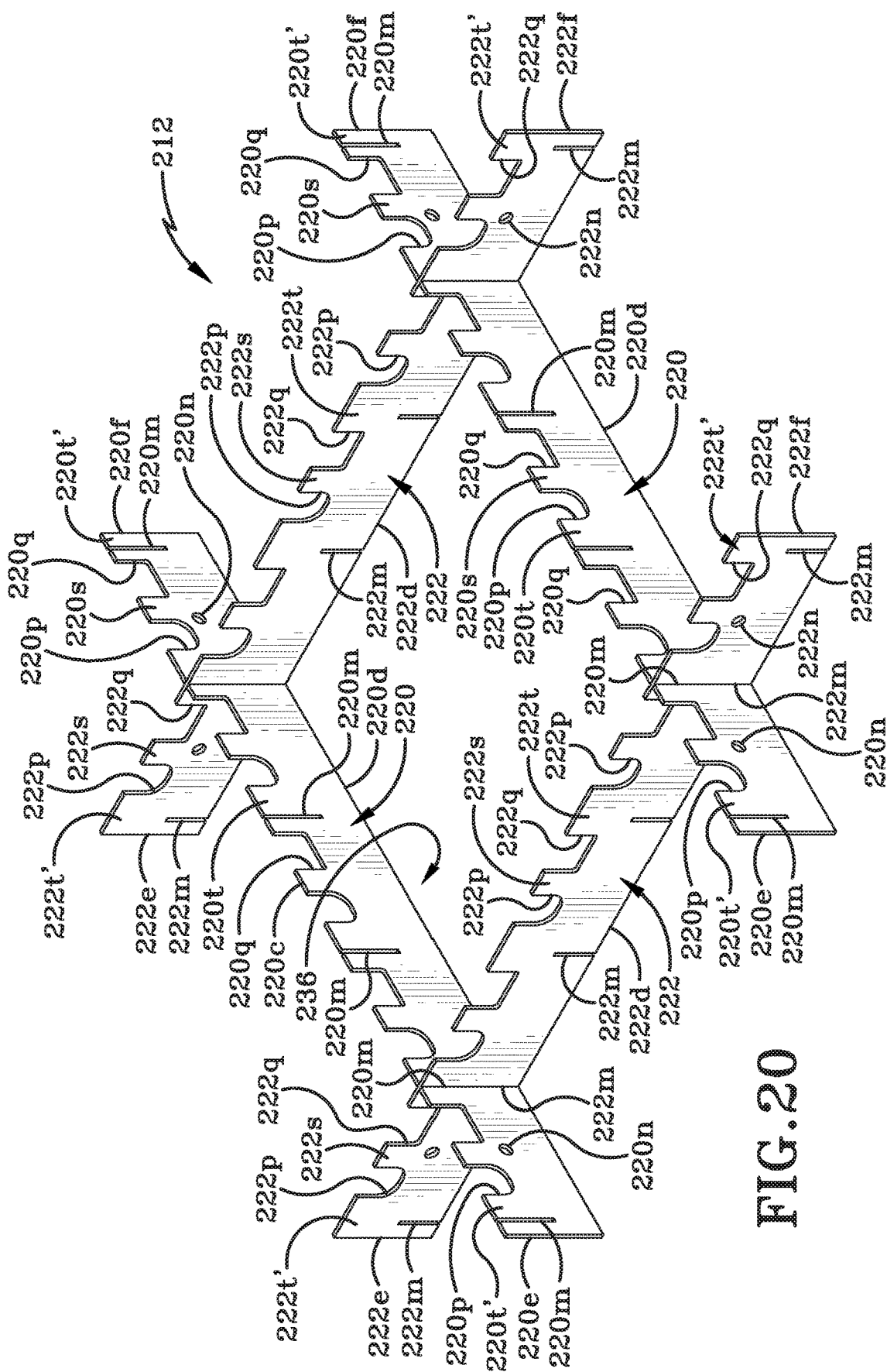
FIG. 20 is an isometric perspective top view of the third embodiment the support rack of FIG. 19 shown in an exemplary second configuration.
Figure 21:
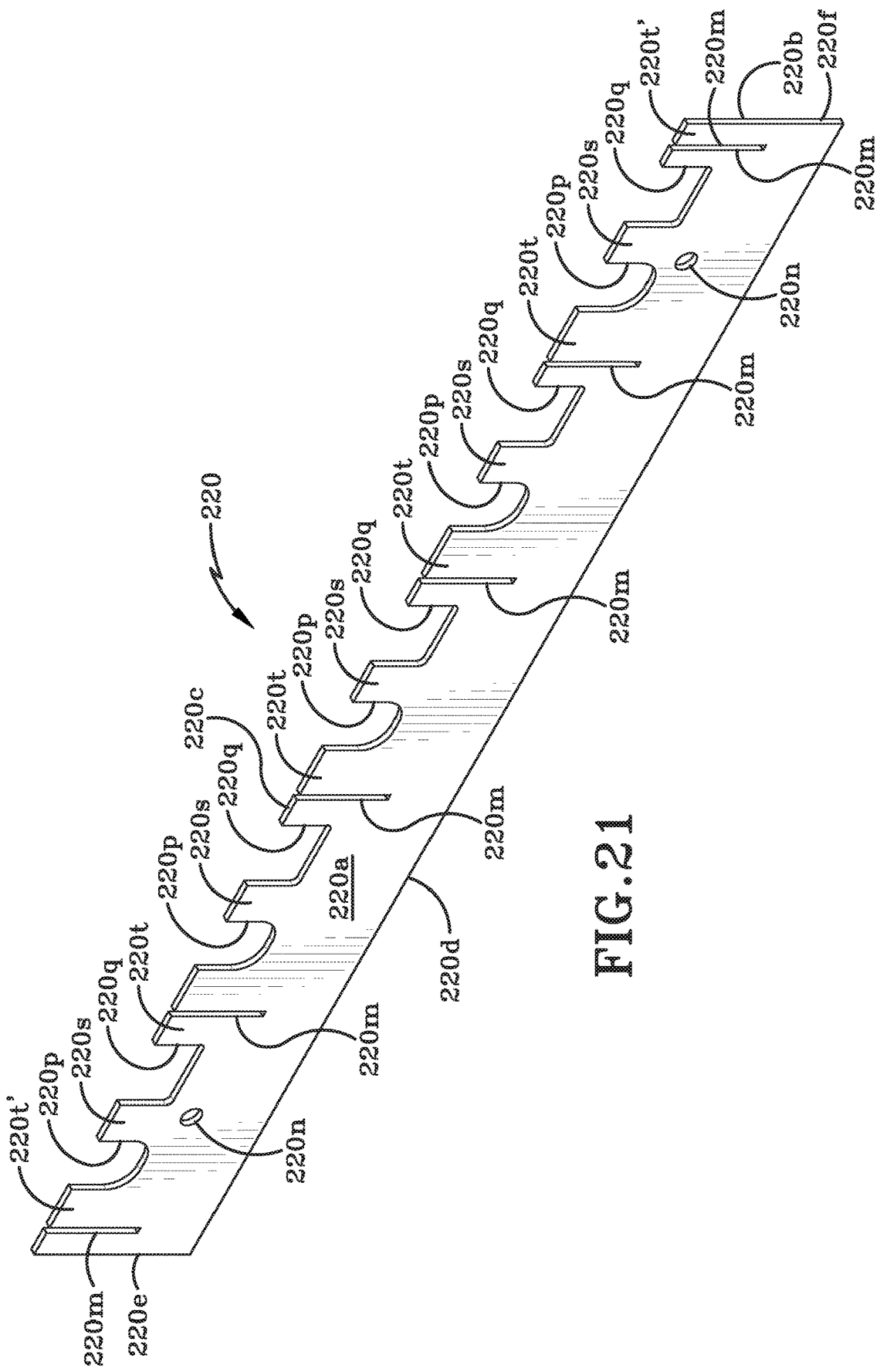
FIG. 21 is an isometric perspective view of a first support member of the support rack of FIG. 19.
Figure 22:
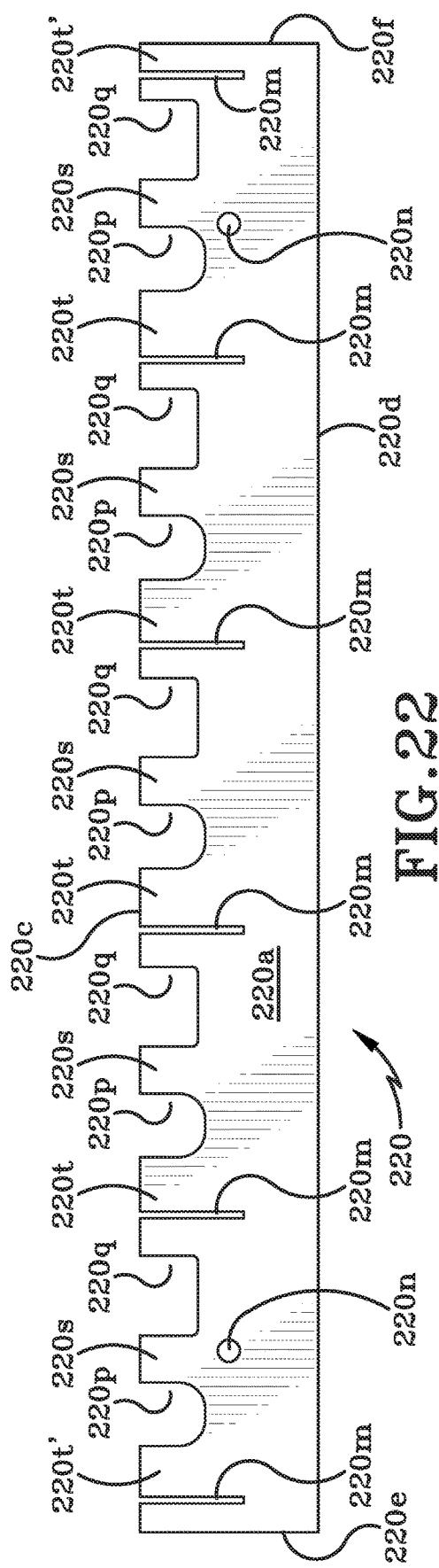
FIG. 22 is a front elevation view of the first support member.
Figure 23:
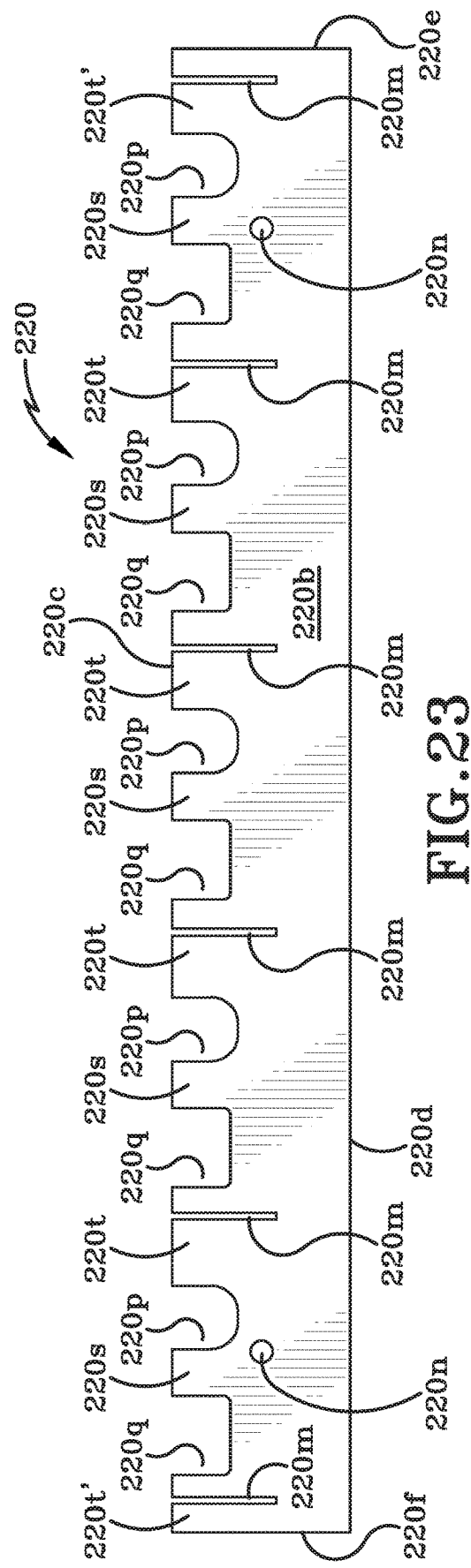
FIG. 23 is a rear elevation view of the first support member.
Figure 28:
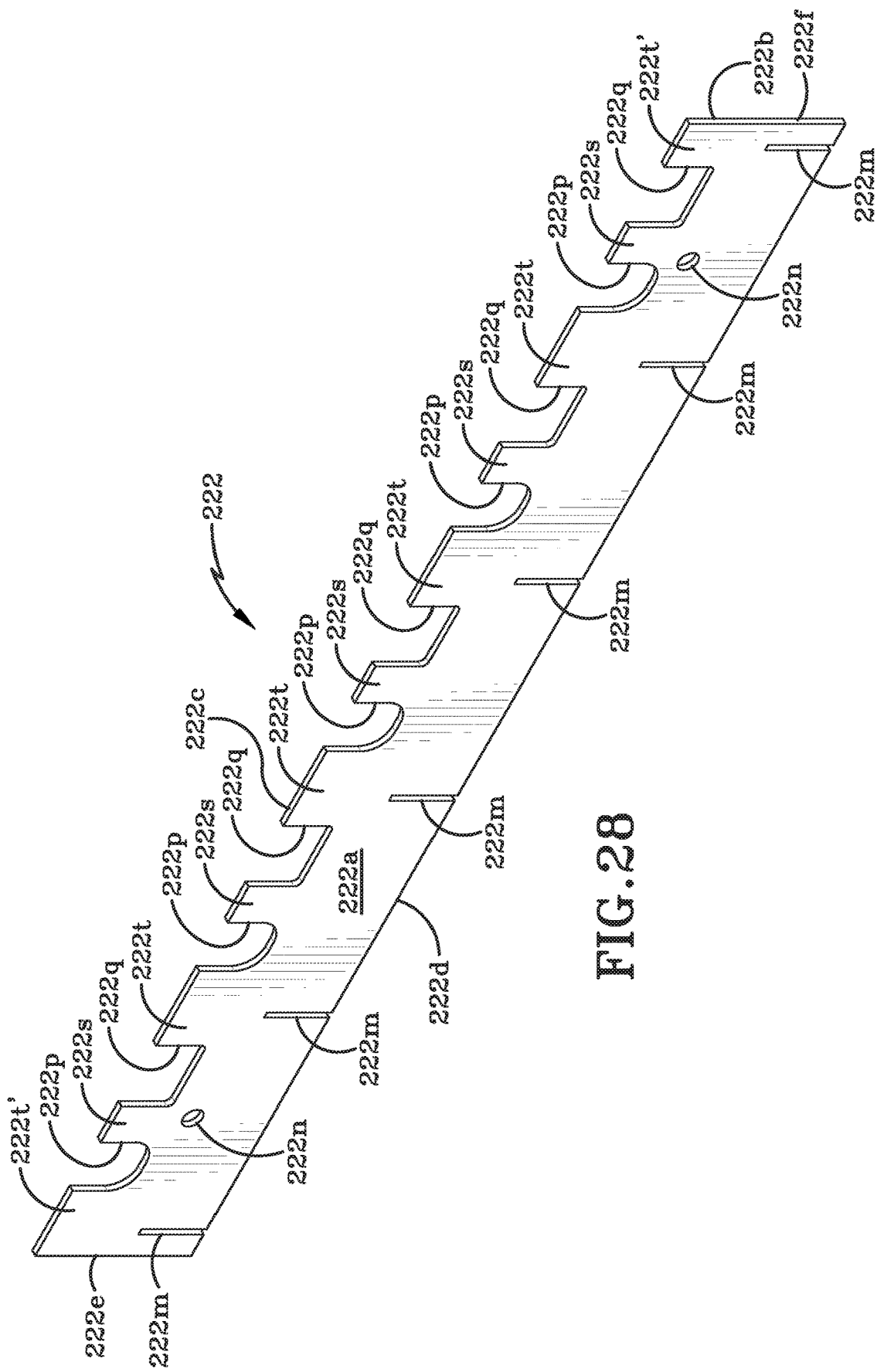
FIG. 28 is an isometric perspective view of a second support member of the support rack of FIG. 19.

FIG. 19 shows the first and second plates 220 and 222 engaged with each other in a first configuration while FIG. 20 shows the first and second plates 220 and 222 engaged with each other in a second configuration. The specific configuration of support rack 212 is selected based on the nature, type, and number of boards 18 to be used as the workpiece that is to be engaged with support rack 212. In arranging the first and second plates 220, 222 to configure the support rack 212, the first plates 220 are oriented parallel to each other and are spaced laterally a first distance apart from each other. First plates 220 form two opposing first sides of support rack 212. Second plates 222 are oriented parallel to each other and are spaced longitudinally a second distance apart from each other. Second plates 222 form two opposing second sides of support rack 212.

First plates 220 are identical to each other and second plates 222 are identical to each other but first and second plates 220, 222, while similar, are not identical to each other. First plates 220 and second plates 222 are, however, configured to interlockingly engage each other to form a frame. The interlocking engagement between first plates 220 and second plates 222 is sufficient to hold the shape of frame without the need for any fasteners or other types of securement mechanism. First plates 220 and second plates 222 are designed so that the size of the support rack 212 may be longitudinally or laterally adjusted. FIG. 19 shows that first plates 220 and second plates 222 interlock with each other in such a way that a space 236 is bounded and defined by them. The size of space 236 may vary based on the specific configuration of the support rack 212.

FIGS. 21-27 show a single first plate 220 on its own. First plate 220 includes a front surface 220a, a back surface 220b, a top edge 220c, a bottom edge 220d, a first end 220e, and a second end 220f. A plurality of U-shaped slots 220p and a plurality of rectangularly-shaped slots 220q are defined in first plate 220. Each slot 220p and 220q originates in top edge 220c and extends for a distance downwardly towards bottom edge 220d. Slots 220p, 220q terminate a distance away from bottom edge 220d. Each slot 220p, 220q extends from front surface 220a to back surface 220b.

Each U-shaped slot 220p is substantially identical in configuration to the U-shaped slots 20g described earlier herein and therefore will not be further discussed herein. Each slot 220q is substantially similar to slots 120g, 120h but is of a different width and depth with respect to top edge 220c. As illustrated, the bottom regions of each slot 220p, 220q are generally horizontally aligned with each other. Slots 220q and 220p originate in top edge 220c and extend downwardly therefrom, terminating less than half way between top edge 220c and bottom edge 220d. It will be understood that rectangularly-shaped slots identical to either of slots 120g, 120h may be provided instead of slots 220q.

Each slot 220p is separated from an adjacent slot 220q by a first tab 220s. One slot 220p, one slot 220q, and the intermediate first tab 220s are separated from the next slot 220p, slot 220q, and intermediate tab 220s by a second tab 220t. Second tab 220t is of a greater width than first tab 220s. The exceptions to this are the end regions of first plate 220; in these locations only a partial second tab 220t' is provided.

FIGS. 19 to 23 show that a slit 220m is defined in each second tab 220t. Each slit 220m is located generally centrally within the width of second tab 220t. Each slit 220m originates in top edge 220c and extends downwardly towards bottom edge 220d. Slits 220m terminate a distance away from bottom edge 220d. It should be noted that the slits 220m terminate closer to bottom edge 220d than do either of slots 220p, 220q. Each slit 220m extends from front surface 220a through to back surface 220b. Slits 220m are also defined in partial second tabs 220t'. It should be noted that bottom edge 220d of first plate 220 may be substantially continuous and unbroken by any slits, slots, or apertures.

One or more apertures 220n may be defined in first plate 220. Apertures 220n are spaced a distance inwardly from each of top edge 220c and bottom edge 220d. Apertures 220n may be located a distance inwardly from first end 220e or from second end 220f and serve the same purpose as apertures 20n or 120n.

FIGS. 28 to 34 show a single second plate 222 on its own. Second plate 222 includes a front surface 222a, a back surface 222b, a top edge 222c, a bottom edge 222d, a first end 222e, and a second end 222f.

A plurality of U-shaped slots 222p and a plurality of rectangularly-shaped slots 222q are provided in second plate 222. Slots 222p and 222q are substantially identical to slots 220p and 220q and are arranged in a similar manner on second plates 222 to the way the slots 220p, 220q are arranged on first plates 220. Each U-shaped slot 222p is substantially identical in configuration to the U-shaped slots 20g described earlier herein and therefore will not be further discussed herein Each slot 222q is substantially similar to slots 120g, 120h but is of a different width and depth with respect to top edge 222c. As illustrated, the bottom regions of each slot 222p, 222q are generally horizontally aligned with each other. Slots 222p and 222q originate in top edge 222c and extend downwardly therefrom, terminating less than half way between top edge 222c and bottom edge 222d. Each slot 222p, 222q extends from front surface 222a to back surface 222b. It will be understood that rectangularly-shaped slots identical to either of slots 120g, 120h may be provided instead of slots 222q.

Each slot 222p is separated from an adjacent slot 222q by a first tab 222s. One slot 222p, one slot 222q, and the intermediate first tab 222s are separated from the next slot 222p, slot 222q, and intermediate tab 222s by a second tab 222t. Second tab 222t is of a greater width than first tab 222s. The exceptions to this are the end regions of second plate 222; in these locations only a partial second tab 222t' is provided.

FIGS. 28 to 34 also show that a plurality of slits 222m is defined bottom edge 222d of second plate 222. Each slit 222m originates in bottom edge 222d and extends upwardly towards top edge 222c. Slits 222m terminate a distance away from top edge 222c and from the bottom regions of U-shaped slots 220p and rectangularly-shaped slots 222q. Each slit 222m extends from front surface 222a through to back surface 222b. Each slit 222d is generally aligned with a midline of one of the second tabs 222t. The exception to this is, again, the portion of second tabs 222t' proximate first end 222e end or proximate second 222f, where the slit 222m is positioned where a midline of a full width second tab 222t would be located. Each slit 222m is smaller in overall height relative to each slit 220m.

One or more apertures 222n may be defined in second plate 222. Apertures 222n are spaced a distance inwardly from each of top edge 222c and bottom edge 222d. Apertures 222n may be located a distance inwardly from first end 220e or from second end 220f and serve substantially the same purpose as apertures 22n.

First plate 220 and second plate 222 are of substantially the same length "L" as measured from first end 220e, 222e to second 220f, 220f. First plate 220 and second plate 222 are also of the same height "H" as measured from top edge 220c, 222c to bottom edge 220d, 222d. These figures also show that slits 220m, 222m, first tabs 220s, 222s, second tabs 220t, 222t and apertures 220n, 222n are located in substantially identical positions along the lengths "L" of first plate 220 and second plate 222.

As can be seen from FIGS. 19 and 20, when support rack 212 is assembled the first plates 220 are placed bottom edge 222d down on a surface "S". First plates 220 are positioned so that they are laterally spaced apart but longitudinally aligned with each other. In other words, first ends 220e of the two plates 220 are aligned with each other and second ends 220f of the two plates 220 are aligned with each other. One of the second plates 222 is then engaged with the two first plates 220. This may be done by aligning the slit 222m closest to first end 222e of second plate 222 with slit 220m closest to first end 220e of one of first plates 220. The slit 222m closest to second end 222f of second plate 222 is then aligned with slit 220m closest to first end 220e of the other of the first plates 220. Second plate 222 is then moved downwardly towards to two first plates 220 and so that slits 222m proximate first end 222e and second end 222f slide into slits 220m proximate first ends 220e. Second plate 222 is moved downwardly until bottom edge 222d thereof is in the same plane as bottom edge 220d of first plates 220 and is resting on surface "S". The other second plate 222 is then engaged with the two first plates 220 in a similar manner.

Once the four plates 220, 220, 222, 222 are all resting on surface "S", the clamps may be engaged therewith. Because there are U-shaped slits 220p and 222p in support rack 212, first clamp 14 and second clamp 16 (FIG. 1) may be utilized with support rack 212. The first clamp 14 a second clamp 16 may be used with support rack 212 in the same manner as has been described with respect to the use of clamps 14, 16 with support rack 12. Additionally, because there are rectangularly-shaped slots 220q, 222q in support rack 212, first clamp 114, and second clamp 116 may be utilized therewith. First clamp 114 and second clamp 116 may be utilized with support rack 212 in the same manner as has been described with respect to support rack 112.

It will be understood that a support rack may be provided by using any two of the first plates 20, 120, 220 along with any two of the second plates 22, 122, 222. For example a support rack may be formed in which two first plates 20 (FIG. 5) are interlockingly engaged with two second plates 122 (FIG. 15). Alternatively, a completely different support rack may be formed utilizing two first plates 220 (FIG. 21) along with two second plates 22 (FIG. 7). Another completely different support rack may be formed utilizing two first plates 120 (FIG. 13) and two second plates 222 (FIG. 28), and so on. A kit may be sold that includes two sets plates along with the clamps that are able to be engaged with and supported by those specific plates. The kit may therefore include a pair of first plates that have at least a first type of slot defined therein and a pair of clamps that can be engaged with the first type of slot. The kit may further include a pair of second plates that each have at a second type of slot defined therein along with a pair of clamps that can be engaged with and supported by the second type of slot. The kit may further include a pair of additional first plates and/or a pair of additional second plates that have additional slots defined therein that are configured to received different types of additional clamps therein. The craftsman is therefore able to mix and match different sets of plates with each other to configure one or more different configurations of support rack that may be used with different types of clamps.

It is contemplated that slots of shapes other than U-shapes and rectangular shapes may be formed in the plates of one or both the first plates and the second plates, in order to accommodate clamp guide rails that are differently configured from the guide rails disclosed herein. For example, the clamp guide rail may be square in cross-section and the slots formed in the top edges of one or both of the first plates and the second plates may therefore be generally square in shape. It is further contemplated that the first and second plates may include a first series of several differently shaped slots along with at least a second series of the same differently shaped slots in order to be able to receive clamp guide rails therein that have a cross-section that is complementary to any of the differently shaped slots.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A support rack comprising:
    a pair of first plates;
    a second plate;
    wherein each plate of the pair of first plates and the second plate includes:
        a front surface, a back surface, a top edge, a bottom edge, a first end, and a second end;
    wherein each plate of the pair of first plates defines one or more slots originating in the top edge, extending downwardly toward the bottom edge, and terminating a distance upwardly from the bottom edge; wherein the one or more slots are adapted to receive a guide bar of a clamp therein; and wherein the second plate is detachably engageable with the pair of first plates.

2. The support rack according to claim 1, wherein the one or more slots defined in the plate of one of the pair of first plates is aligned with the one or more slots in the plate of the other of the pair of first plates when the second plate is engaged with the pair of first plates; and wherein the pair of first plates are oriented parallel to each other and are spaced a distance apart.

3. The support rack according to claim 1, wherein each plate of the pair of first plates defines at least one first slit spaced from the one or more slots, wherein said at least one first slit originates in the top edge of the plate, extends downwardly toward the bottom edge thereof, and terminates a distance from the bottom edge.

4. The support rack according to claim 3, wherein the second plate defines a pair of second slits each originating in the bottom edge of the second plate, extending towards the top edge thereof and terminating a distance from the top edge; wherein the pair of second slits are spaced a distance apart from each other; and wherein the second plate is detachably interlockingly engageable with the pair of first plates by interlocking each of the pair of second slits with the at least one first slit in each of the pair of first plates.

5. The support rack according to claim 1, wherein at least one slot of the one or more slots is generally U-shaped.

6. The support rack according to claim 1, wherein at least one slot of the one or more slots is substantially rectangular in shape.

7. The support rack according to claim 1, wherein a first slot of the one or more slots is generally U-shaped, and a second slot of the one or more slots is generally rectangular in shape.

8. The support rack according to claim 1, wherein a first slot of the one or more slots is of a first size and shape, and a second slot of the one or more slots is of a second size and shape.

9. The support rack according to claim 1, wherein the second plate includes one or more slots originating in the top edge of the second plate and extending downwardly toward the bottom edge thereof and terminating a distance from the bottom edge of the second plate.

10. The support rack according to claim 9, further comprising an additional second plate that is substantially identical to the second plate.

11. A clamp support system comprising:
a support rack having:
a pair of first plates;
a pair of second plates; wherein the pair of second plates are detachably securable to the pair of first plates;
one or more slots defined in each plate of the pair of first plates; wherein the one or more slots in a first one of the pair of first plates is aligned with the one or more slots in a second one of the pair of first plates; and
a clamp including:
a bar configured to be removably received in the aligned one or more slots; and
a first jaw and a second jaw operatively engaged with the bar; wherein the first jaw and the second jaw are adapted to clamp a workpiece therebetween.

12. The clamp support system according to claim 11, wherein each of the pair of first plates includes a front surface, a back surface, a top edge, a bottom edge, a first end, and a second end, wherein each of the one or more slots originates in the top edge and extends downwardly for a distance toward the bottom edge; and wherein each of the one or more slots extends between the front surface and the back surface.

13. The clamp support system according to claim 11, wherein at least one slot of the one or more slots is one of generally U-shaped and substantially rectangular in shape.

14. The clamp support system according to claim 11, wherein a first slot of the one or more slots is of a first size and shape, and a second slot of the one or more slots is of a second size and shape.

15. The clamp support system according to claim 11, wherein each plate of the pair of second plates includes a front surface, a back surface, a top edge, a bottom, a first end, and a second end;
one or more slots are defined in each plate of the pair of second plates wherein the one or more slots in a first one of the pair of second plates is aligned with the one or more slots in a second one of the pair of second plates; and wherein each of the one or more slots in the pair of second plates originates in the bottom edge thereof, extends upwardly for a distance toward the top edge thereof; and terminates a distance from the top edge.

16. The clamp support system according to claim 15, wherein the clamp is selectively engageable in the aligned one or more slots of one or the other of the pair of first plates and the pair of second plates.

17. The clamp support system according to claim 11, wherein at least one of the first jaw and the second jaw is selectively movable one of towards and away from the other of the first jaw and the second jaw.

18. The clamp support system according to claim 11, further comprising at least one slit defined in each of the pair of first plates and in each of the pair of second plates; wherein the at least one slit in each first plate of the pair of first plates originates in a top edge of first plate and extends downwardly toward a bottom edge thereof; and wherein the at least one slit in each second plate of the pair of second plates originates in a bottom edge of the second plate and extends toward a top edge thereof.

19. A method of clamping a workpiece comprising:
providing a support rack comprising a pair of first plates, wherein each plate of the pair of first plates has a front surface, a back surface, a top edge, a bottom edge, a first end, and a second end;
defining one or more slots in the top edge of each plate of the pair of first plates, wherein each of the one or more slots originates in an opening defined in the top edge, extends downwardly toward the bottom edge of the plate, and terminates a distance upwardly from the bottom edge;
arranging the pair of first plates parallel to one another;
inserting a clamp bar of a clamp into the openings of a pair of opposed and aligned slots defined in the pair of support plates of the support rack;
contacting a first side of the workpiece with a first jaw of the clamp;
contacting a second side of the workpiece with a second jaw of the clamp;
moving one of the first jaw and the second jaw toward the other of the first jaw and the second jaw;

clamping the workpiece between the first and second jaws; and retaining the clamp and the workpiece a distance vertically off a flat surface using the support rack.

20. The method according to claim 19, wherein inserting the clamp bar further comprises:

positioning the clamp bar vertically above the openings to the pair of opposed and aligned slots;

lowering the clamp bar into the pair of opposed and aligned slots through the openings;

moving the clamp bar vertically downwardly through the pair of opposed and aligned slots until the clamp bar comes to rest.

21. The method according to claim 19, further comprising extending a second plate of the support rack between the pair of first plates.

22. The method according to claim 19, wherein extending the second plate of the support rack between the pair of first plates includes detachably engaging the second plate with each plate of the pair of first plates.

23. A method of clamping a workpiece comprising:

inserting a clamp bar of a clamp into a pair of aligned slots defined in a support rack;

contacting a first side of the workpiece with a first jaw of the clamp;

contacting a second side of the workpiece with a second jaw of the clamp;

moving one of the first jaw and the second jaw toward the other of the first jaw and the second jaw;

clamping the workpiece between the first and second jaws; and retaining the clamp and the workpiece a distance vertically off a flat surface using the support rack;

positioning a bottom edge of each of a pair of first plates of the support rack on the flat surface;

orienting a second plate of the support rack above the pair of first plates and at right angles thereto;

aligning a slit in a bottom edge of the second plate with a slit in a top edge of each of the pair of first plates;

pushing the second plate downwardly toward the flat surface; and interlocking the pair of first plates and the second plate together.

* * * * *